(12) United States Patent
Morishita et al.

(10) Patent No.: US 7,606,996 B2
(45) Date of Patent: Oct. 20, 2009

(54) ARRAY TYPE OPERATION DEVICE

(75) Inventors: Hiroyuki Morishita, Osaka (JP);
Takeshi Tanaka, Osaka (JP); Masaki Maeda, Osaka (JP); Yorihiko Wakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 99 days.

(21) Appl. No.: 11/572,701

(22) PCT Filed: Aug. 2, 2005

(86) PCT No.: PCT/JP2005/014077

§ 371 (c)(1),
(2), (4) Date: Jan. 18, 2008

(87) PCT Pub. No.: WO2006/013839

PCT Pub. Date: Feb. 9, 2006

(65) Prior Publication Data
US 2008/0282061 A1    Nov. 13, 2008

(30) Foreign Application Priority Data
Aug. 4, 2004    (JP)    ............................. 2004-227927

(51) Int. Cl.
G06F 15/80    (2006.01)
(52) U.S. Cl. ........................................................ 712/17
(58) Field of Classification Search ................... 712/10, 712/11, 12, 13, 14, 15, 16, 18, 19, 20, 21, 712/22
See application file for complete search history.

(56) References Cited

U.S. PATENT DOCUMENTS 5,659,785 A    8/1997    Pechanek et al.
5,768,561 A *    6/1998    Wise ............................ 710/63

FOREIGN PATENT DOCUMENTS

| JP | 1-295335 | 11/1989 |
|----|----------|---------|
| JP | 2-18687 | 1/1990 |
| JP | 3-268054 | 11/1991 |
| JP | 4-120652 | 4/1992 |
| JP | 9-22404 | 1/1997 |

* cited by examiner

Primary Examiner—William M Treat

(57) ABSTRACT

An array calculation device that includes a processor array composed of a plurality of processor elements having been assigned with orders, acquires an instruction in each cycle, generates, in each cycle, operation control information for controlling an operation of a processor element of a first order, and then generates an instruction to the processor element of the first order in accordance with the operation control information and the acquired instruction, and also generates, in each cycle, operation control information for controlling an operation of each processor element of a next order and onwards, in accordance with operation control information generated for controlling an operation of a processor element of an immediately preceding order, and then generates an instruction to each processor element of the next order and onwards, in accordance with the operation control information generated and the acquired instruction.

6 Claims, 30 Drawing Sheets

FIG. 1
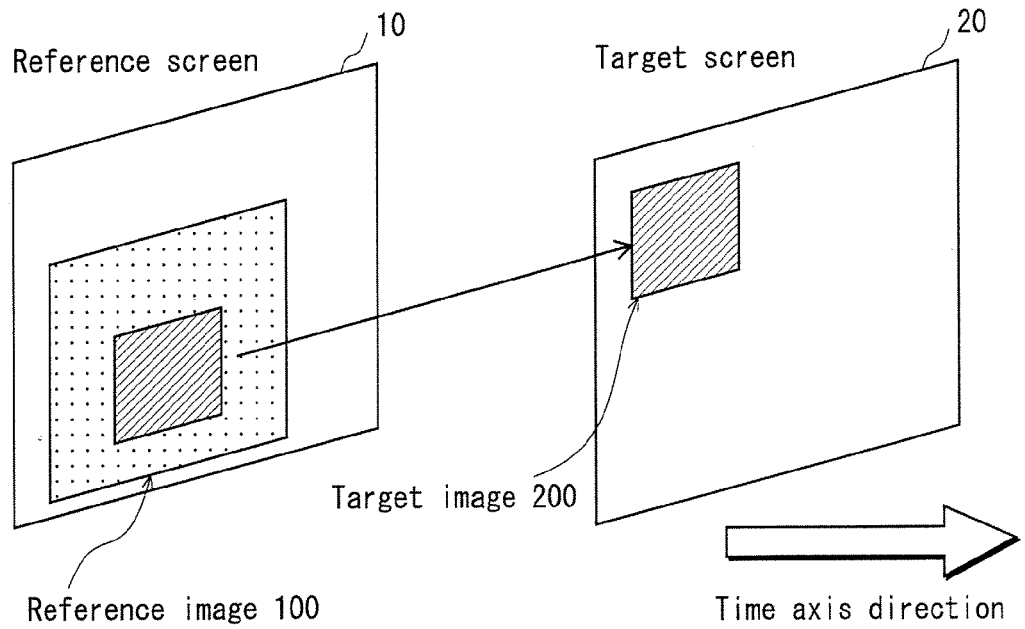
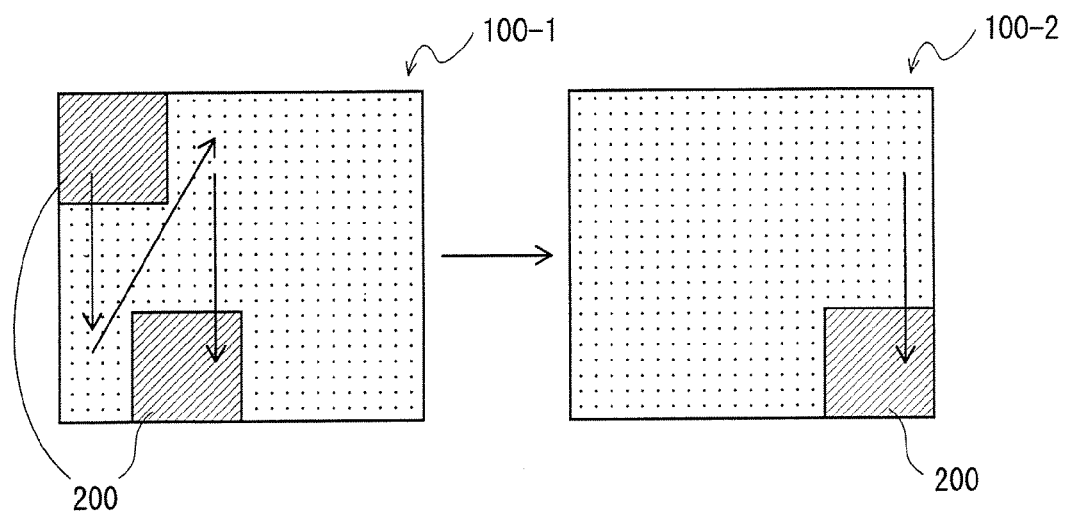

FIG. 14

| token/inst | exec_array | set_counter | start_token | |
|---|---|---|---|---|
| | Execute calculation | Set token generation counter | Start generating token | ~5302 |
| inval | nop | — | — | ~5303 |
| val | exec | — | — | ~5304 |

~5301, 5300

Program example:

```
         set_counter 0x8      Set token generation counter
                              (to generate valid eight times)
5400     start_token           Start generating token
5401     ld[addr],r0           Load address of reference data
         exec_array r0         Execute calculation, generate val token
         ld[addr],r0           Load address of reference data
         exec_array r0         Execute calculation, generate val token
         ld[addr],r0           Load address of reference data
         exec_array r0         Execute calculation, generate val token
         ld[addr],r0           Load address of reference data
         exec_array r0         Execute calculation, generate val token
         ─────────────────────────────────────────────────────────
         ld[addr],r0           Load address of reference data
         exec_array r0         Execute calculation, generate val token
         ld[addr],r0           Load address of reference data
         exec_array r0         Execute calculation, generate inval token
         ld[addr],r0           Load address of reference data
         exec_array r0         Execute calculation, generate inval token
         ld[addr],r0           Load address of reference data
         exec_array r0         Execute calculation, generate inval token
```

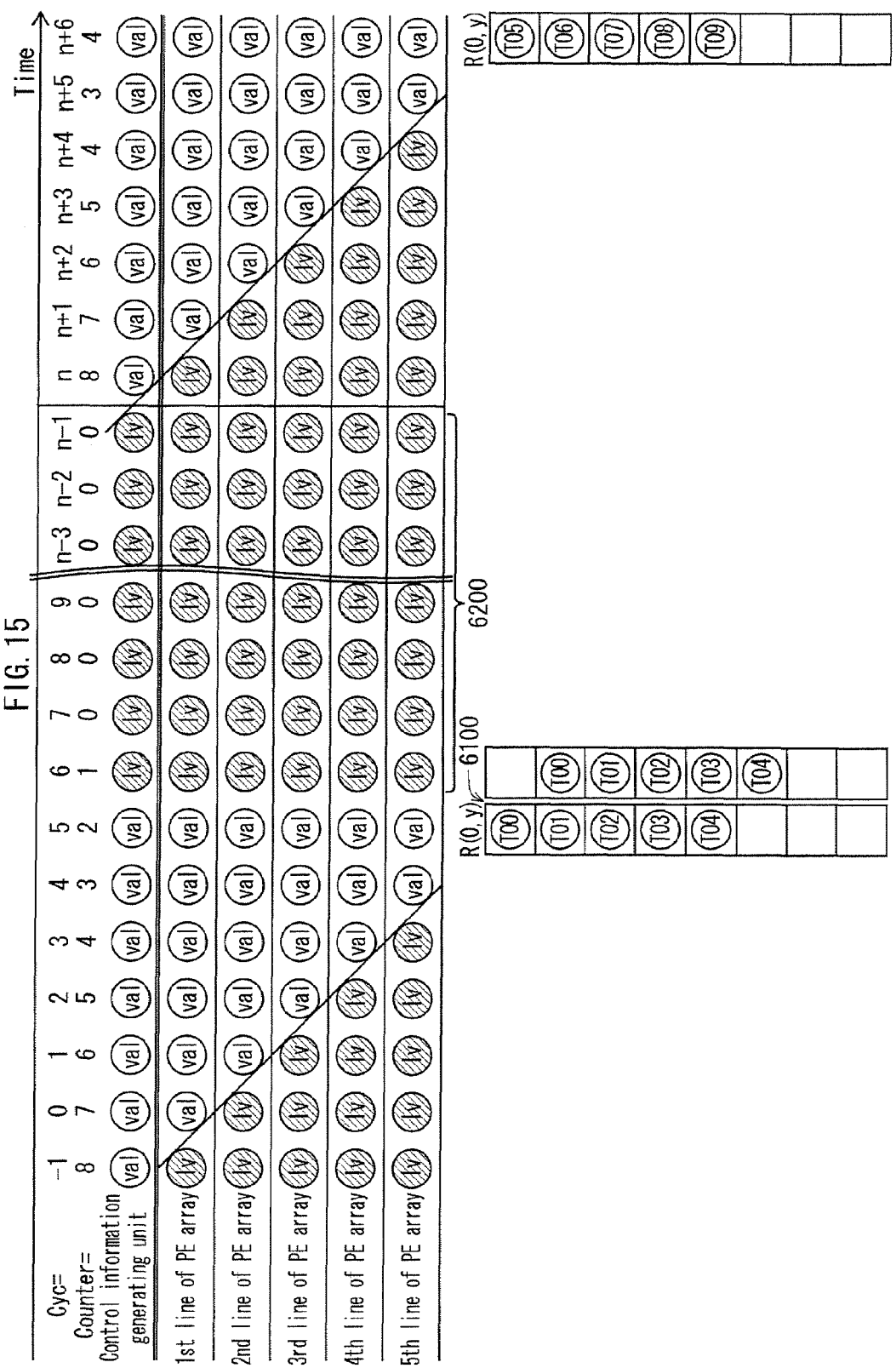

| token/inst | exec_array | set_counter | start_token |
|---|---|---|---|
|  | Execute calculation | Set token generation counter | Start generating token |
| inval | nop | — | — |
| val | exec | — | — |

5301
5302
5303
5304

Program example:

```
           set_counter 0x8    Set token generation counter
                                (to generate token eight times)
5400       start_token         Start generating token
5401       ld[addr],r0         Load address of reference data
           exec_array r0       Execute calculation, generate val token
           ld[addr],r0         Load address of reference data
           exec_array r0       Execute calculation, generate val token
           ld[addr],r0         Load address of reference data
           exec_array r0       Execute calculation, generate val token
           ld[addr],r0         Load address of reference data
           exec_array r0       Execute calculation, generate val token
```

```
           ld[addr],r0         Load address of reference data
           exec_array r0       Execute calculation, generate val token
           ld[addr],r0         Load address of reference data
           exec_array r0       Execute calculation, generate inval token
           ld[addr],r0         Load address of reference data
           exec_array r0       Execute calculation, generate inval token
           ld[addr],r0         Load address of reference data
           exec_array r0       Execute calculation, generate inval token
```

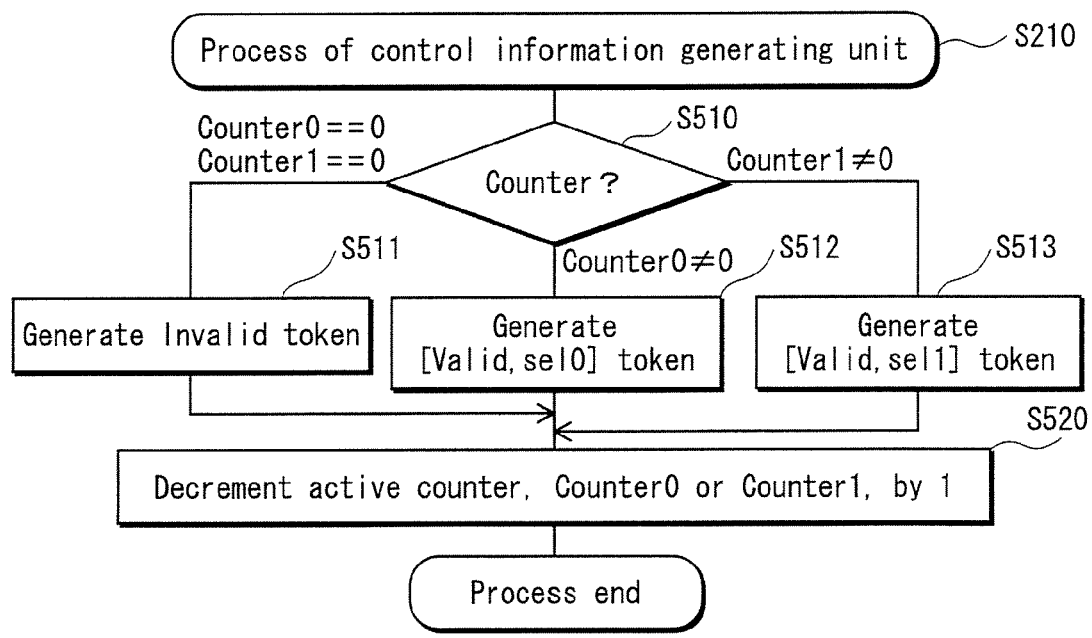
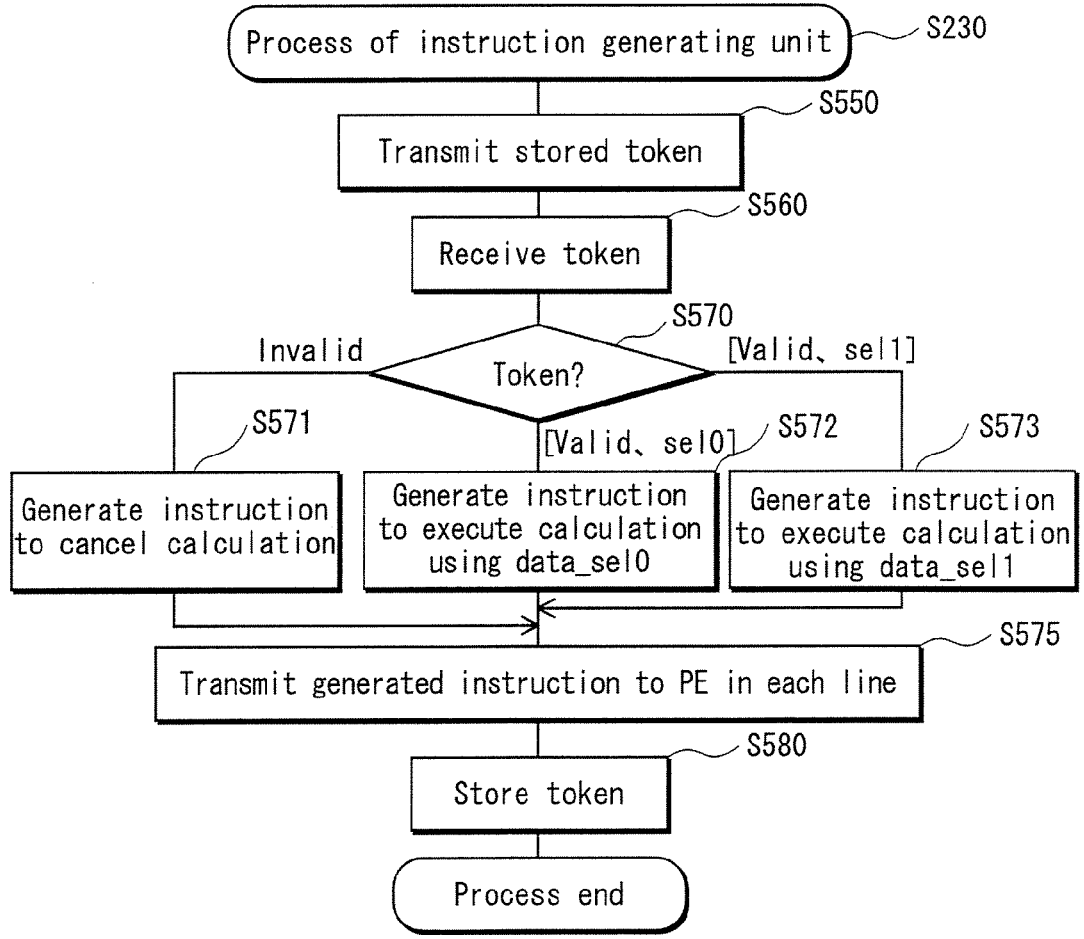

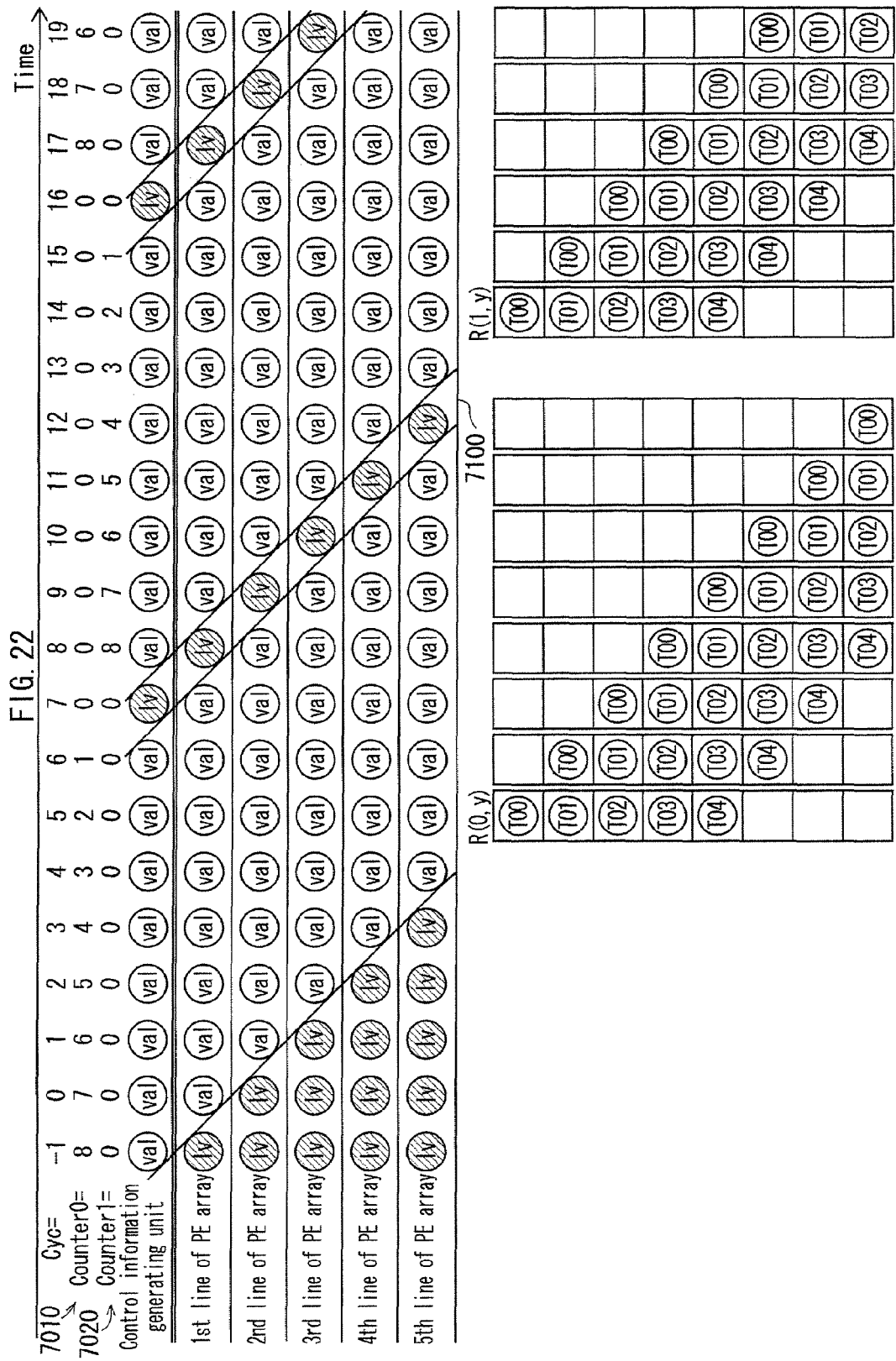

FIG. 23

| | token/inst | exec_array | set_counter0 | start_token0 | set_counter1 | start_token1 |
|---|---|---|---|---|---|---|
| 7301 | | | Set token generation counter 0 | Start generating token 0 | Set token generation counter 1 | Start generating token 1 |
| 7302 | | Execute calculation | | | | |
| 7303 | inval | nop | — | — | — | — |
| 7304 | val:sel0 | Use data_sel0 | — | — | — | — |
| 7305 | val:sel1 | Use data_sel1 | — | — | — | — |

Program example:
```
         set_counter0 0x8       Set token generation counter 0  (to generate valid eight times)
         set_counter1 0x0       Set token generation counter 1  (to generate valid eight times)
         start_token0           Start generating token (counter 0)
7400 ─── ldp[addr],r0,r1        Load address of reference data
7401 ─── exec_array r0,r1       Execute calculation, generate val:sel0 token
         ldp[addr],r0,r1        Load address of reference data
         exec_array r0,r1       Execute calculation, generate val:sel0 token ldp[addr],r0,r1        Load address of reference data
         exec_array r0,r1       Execute calculation, generate val:sel0 token
         start_token1           Start generating token (counter 1)
         ldp[addr],r0,r1        Load address of reference data
         exec_array r0,r1       Execute calculation, generate val:sel1 token
         ldp[addr],r0,r1        Load address of reference data
         exec_array r0,r1       Execute calculation, generate val:sel1 token
         ldp[addr],r0,r1        Load address of reference data
         exec_array r0,r1       Execute calculation, generate val:sel1 token
```

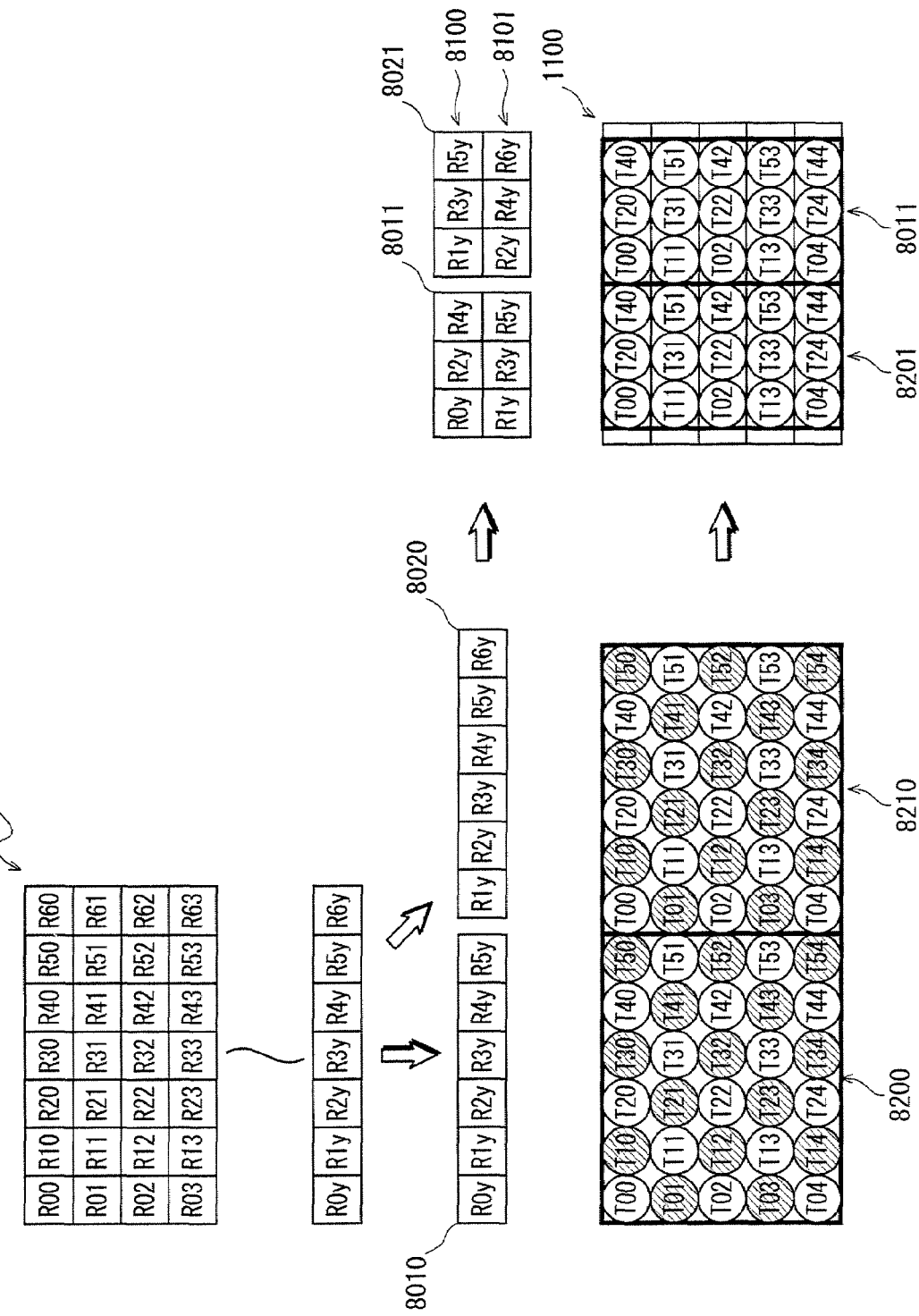

FIG. 30

| token/inst | exec_array | set_counter | start_token | |
|---|---|---|---|---|
| | Execute calculation | Set token generation counter | Start generating token | ~ 8601 / ~ 8602 |
| inval | nop | — | — | ~ 8603 |
| val:sel0 | Use data_sel0 | — | — | ~ 8604 |
| val:sel1 | Use data_sel1 | — | — | ~ 8605 |

8600

Program example:

```
         set_counter 0x8    Set token generation counter
                            (to generate token eight times)
8700     start_token        Start generating token
8701     ldp[addr],r0,r1    Load address of reference data
         exec_array r0,r1   Execute calculation, generate val:sel0 token
8702     ldp[addr],r0,r1    Load address of reference data
         exec_array r0,r1   Execute calculation, generate val:sel1 token
         ldp[addr],r0,r1    Load address of reference data
         exec_array r0,r1   Execute calculation, generate val:sel0 token
         ldp[addr],r0,r1    Load address of reference data
         exec_array r0,r1   Execute calculation, generate val:sel1 token
         ldp[addr],r0,r1    Load address of reference data
         exec_array r0,r1   Execute calculation, generate val:sel0 token
```

```
         ldp[addr],r0,r1    Load address of reference data
         exec_array r0,r1   Execute calculation, generate inval token
         ldp[addr],r0,r1    Load address of reference data
         exec_array r0,r1   Execute calculation, generate inval token
         ldp[addr],r0,r1    Load address of reference data
         exec_array r0,r1   Execute calculation, generate inval token
```

ARRAY TYPE OPERATION DEVICE

TECHNICAL FIELD

The present invention relates to a signal processing LSI for use in a video and/or audio device such as a DVD recorder or a digital TV using a digital signal, and specifically relates to an image signal processing LSI.

BACKGROUND ART

In recent years, digitalization of motion pictures has become widespread, as represented by the terrestrial digital broadcasting.

In line with this, technologies of compressing motion pictures have been developed. For example, MPEG (Moving Picture Experts Group) encoding has achieved a highly efficient compression by detecting and storing only moving portions of an image.

Also, with the diversification of digital AV devices and the like in recent years, an MPEG encoding LSI is now loaded in various types of devices. For example, an application called MPEG2 Encode can operate in desktop DVD recorders and also in camcorders being mobile devices.

In this case, although the same application, namely MPEG2 Encode, is used in both types of devices, the desktop DVD recorders are required to execute an algorithm that guarantees higher image quality than the camcorders being mobile devices.

To satisfy the requirement, it is desirable that processes are performed flexibly depending on the purposes by software on common hardware.

Here, the MPEG encoding will be explained briefly. According to this method, it is required to store (i) motion vectors, which represent the direction and the degree of a move of an object of the current frame in the past and future frames, and (ii) amounts of change in the brightness and color difference, that are not represented by the motion vectors.

The process of obtaining the motion vectors is called a motion vector detection process (see FIG. 1). The process requires a very large amount of processing, compared with general image processes such as resize filtering or motion compensation.

The reason for requiring the very large amount of processing is as follows. In general, with respect to a unit called macro block of 16×16 pixels (FIG. 1, target image 200), a search is made for where in the past or future frame (FIG. 1, reference image 100) the macro block moves to, by shifting it in sequence by one pixel. As a result of the search, a portion having the highest degree of similarity with the target image is detected, and the motion vector of the detected portion is obtained. The number of macro blocks contained in a frame is, for example, 1350 in the case of a frame composed of 720×480 dots. The search is made for each of the macro blocks.

Accordingly, in MPEG encoding, the performance of the motion vector detection process is important.

Since the motion vector detection process is a repetition of the same process, technologies for improving the processing performance by using a calculation device, in which a plurality of calculators are expanded in one or two dimensional direction, have been developed.

Currently, calculation devices in which calculators are expanded in one dimensional direction are used in general image processing. In such calculation devices, however, only a small number of calculators can used in parallel. And in many cases, reduction of operating frequency, namely reduction of voltage cannot be achieved sufficiently. For this reason, in terms of the problem of heat and power consumption, it is desirable for mobile devices and home electric appliances to use a calculation device in which calculators are expanded in two dimensional direction (hereinafter referred to as two dimensional array calculation device) since the two dimensional array calculation devices can include more calculators that can be used in parallel and can use less operating frequency than one dimensional array calculation devices.

As one of technologies for improving the performance of the two dimensional array calculation devices, disclosed is a technology for reducing the wait time that occurs during data communications among a plurality of calculators (see Document 1).

Document 1: Japanese Patent Application Publication No. 09-022404

DISCLOSURE OF THE INVENTION

The Problems the Invention is Going to Solve

However, since the two-dimensional array calculation devices need to control a large number of calculators, the software for controlling the calculators and achieving different algorithms depending on the devices should use instructions with extended lengths.

This results in the increase in scale of the instruction memory to which the instructions are fetched, and of the instruction decoder for decoding the instructions. This leads to the increase in area of the hardware and to the increase in the cost of LSI.

It is therefore an object of the present invention to provide a two dimensional array calculation device which is flexibly controlled by software to achieve efficient parallel processing, and includes hardware with restricted size of area.

Means to Solve the Problems

The above object is fulfilled by an array calculation device comprising: a processor array composed of a plurality of processor elements having been assigned with orders; an instruction acquiring unit operable to acquire an instruction in each cycle; a first unit operable to generate, in each cycle, operation control information for controlling an operation of a processor element of a first order, and then generate an instruction to the processor element of the first order in accordance with the operation control information and the instruction acquired by the instruction acquiring unit; and a second unit operable to generate, in each cycle, operation control information for controlling an operation of each processor element of a next order and onwards, in accordance with operation control information generated for controlling an operation of a processor element of an immediately preceding order, and then generate an instruction to each processor element of the next order and onwards, in accordance with the operation control information generated by the second unit in each cycle and the instruction acquired by the instruction acquiring unit.

Effects of the Invention

With the above-described construction, the array calculation device of the present invention can cause a plurality of processor elements (hereinafter referred to as PEs) to operate differently by one instruction. This achieves a flexible process using a plurality of PEs.

Also, the reduced number of instructions leads to reduction of the hardware resources required for the execution.

In the above-stated array calculation device, the plurality of processor elements constituting the processor array may be connected to each other by signal lines, and with respect to each of the plurality of processor elements, a calculation result of a processor element is transferred to a processor element of a next order, in each cycle via a signal line.

With the above-described construction, the array calculation device can transfer the calculation result of a PE to a next PE. This enables the calculation results of a plurality of PEs to be processed all at once, improving the processing speed.

The above-stated array calculation device may further comprise a basic control information generating unit operable to generate basic control information in each cycle, wherein the operation control information for controlling the operation of the processor element of the first order is generated in accordance with the basic control information generated by the basic control information generating unit.

With the above-described construction, it is possible to generate only one piece of control information to influence the operation of all PEs. This makes it possible to perform various processes in the same PE array.

In the above-stated array calculation device, each processor element may include a data acquiring unit operable to acquire a plurality of types of data, the operation control information includes specification information that specifies a type of data to be used when each processor element executes an instruction, and each processor element acquires and uses data of the type specified by the specification information when executing an instruction.

With the above-described construction, it is possible to specify the data that is used when each processor element executes an instruction. This achieves a more flexible process.

In the above-stated array calculation device, the operation control information may be information that specifies whether or not to execute the instruction acquired by the instruction acquiring unit, and if the operation control information specifies to execute the instruction, the processor element executes the instruction, and if the operation control information specifies not to execute the instruction, a power supply to the processor element is inhibited.

With the above-described construction, it is possible to inhibit a power supply to a processor element that does not perform a calculation, resulting in reduction of power consumption.

The above object is also fulfilled by an array calculation device comprising: a processor array of a two dimensional array structure in which processor elements are arranged in M lines by N columns, wherein N pieces of processor elements in each line are connected by signal lines, and the processor elements are connected so that a calculation result of each processor element is transferred to a processor element of a next line; a basic control information generating unit operable to generate basic control information in each cycle; an instruction acquiring unit operable to acquire an instruction in each cycle; a first unit operable to generate, in each cycle, operation control information for controlling an operation of a processor element of a first line, in accordance with the basic control information generated by the basic control information generating unit, and then generate an instruction to the first line in accordance with the operation control information and the instruction acquired by the instruction acquiring unit; and a second unit operable to generate, in each cycle, operation control information for controlling an operation of each processor element of 2-M lines, in accordance with operation control information generated for controlling an operation of a processor element of an immediately preceding line, and then generate an instruction to each processor element of 2-M lines, in accordance with the operation control information generated by the second unit in each cycle and the instruction acquired by the instruction acquiring unit, wherein the N pieces of processor elements in each line of the processor array execute an instruction to the line.

With the above-described construction, it is possible to cause a plurality of PEs to operate differently by issuing only one instruction to a two dimensional array calculation device. This achieves a more flexible process.

BRIEF DESCRIPTION OF THE DRAWING

FIG. 1 shows a detection method for use in the motion vector detection process.

FIG. 14 shows an example of a program in Embodiment 1.

FIG. 15 shows tokens and operations of PEs on a time axis in Embodiment 2.

FIG. 16 shows an example of a program in Embodiment 2.

FIG. 21A is a flowchart showing the process of the control information generating unit 3000 in Embodiment 3, and FIG. 21B is a flowchart showing the process of the instruction generating units (3100 and the like) in Embodiment 3.

FIG. 22 shows tokens and operations of PEs on a time axis in Embodiment 3.

FIG. 23 shows an example of a program in Embodiment 3.

FIG. 24 shows an example of the target image and the reference image supplied to the PE array in Embodiment 4.

FIG. 30 shows an example of a program in Embodiment 4.

DESCRIPTION OF CHARACTERS 100 reference image
200 target image
1000 array calculation device
1001 program counter
1002 instruction memory
1003 instruction issuing unit
1004 program storage unit
1005 memory cache
1006 memory cache 0
1007 memory cache 1
1009 bus
1100 PE array
1200 addition unit
2000 PE
2100 calculation unit
2200 target data storage unit
2300 reference data storage unit
2400 correlation storage unit
2410 calculation result data
2420 received data
3000 control information generating unit
3010 counter storage unit
3110, 3210, 3310 control information storage unit
5201, 5211, 6100 calculation result
5300, 7300, 8600 program instruction list

BEST MODE FOR CARRYING OUT THE INVENTION

Embodiment 1

<Outline>

Figure 3A:
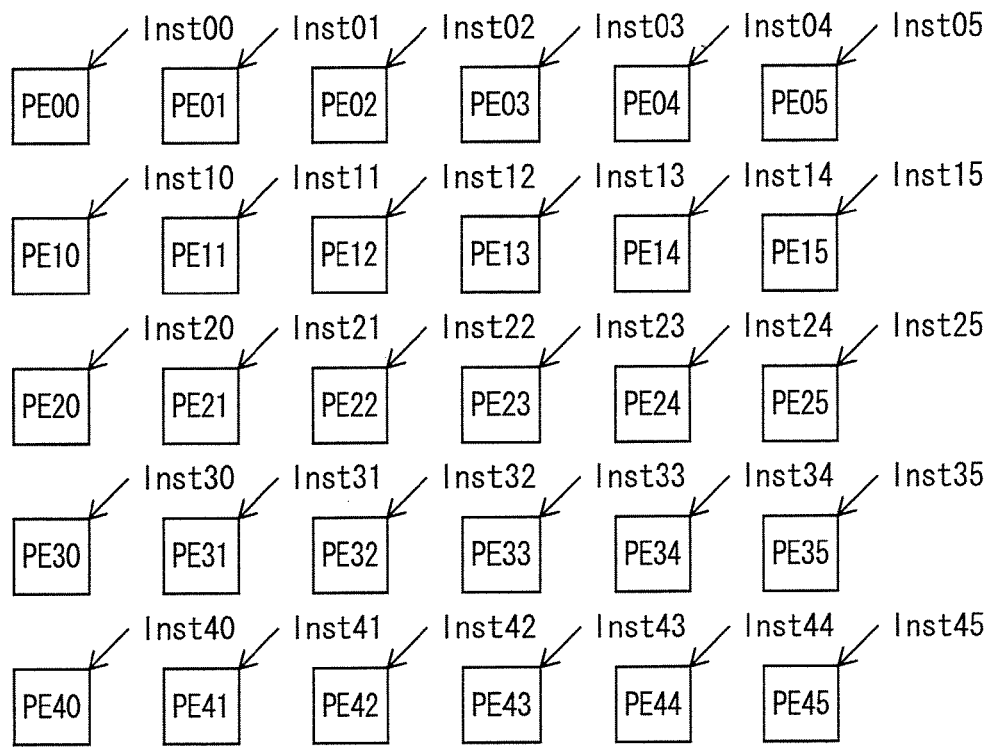
FIGS. 3A and 3B show examples of conventional array processors.

An array calculation device of the present invention is a two dimensional array calculation device that is constructed to restrict the increase in size of the instruction memories and instruction decoders, by reducing the number of instruction memories and instruction decoders and restricting in length the instructions in the software that controls calculators arranged in an array.

for example, when independent calculation instructions are respectively issued to PEs (Processor Elements) constituting an operational array as shown in FIG. 3A, as many instructions as PEs are necessary. In this case, in general, as many instruction decoders and as many instruction memories as PEs are necessary.

Figure 3B:
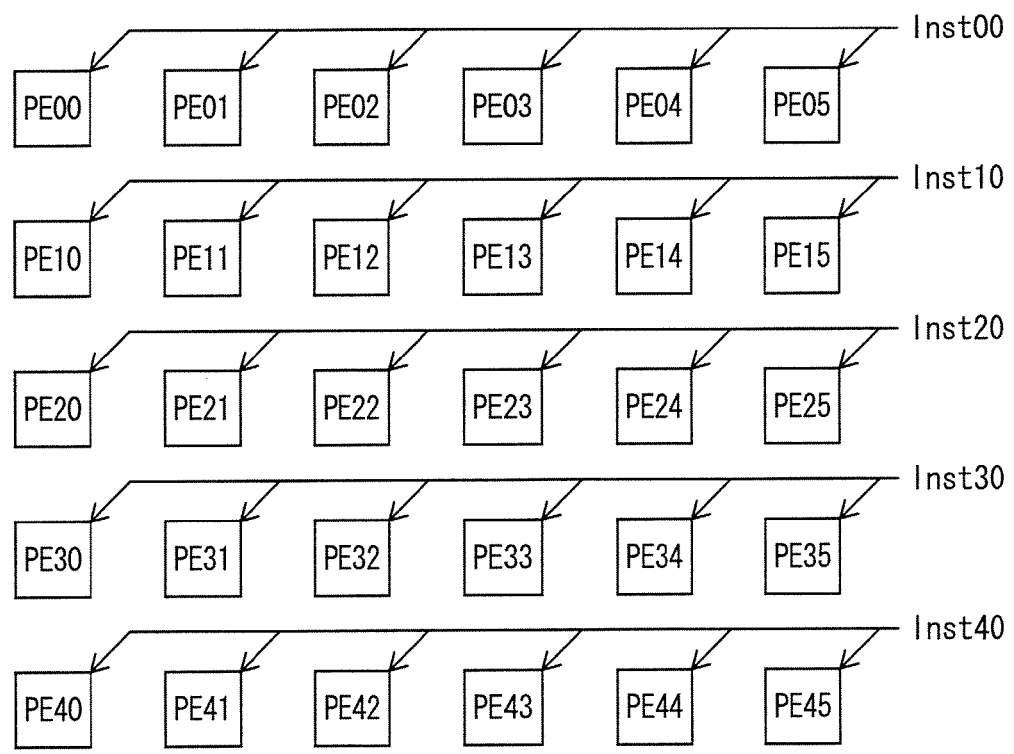

A similar problem occurs in a one-dimensional array calculation device as shown in FIG. 3B.

As a method for solving such problems, SIMD (Single Instruction Multi Data) is known. The method is constructed to issue a common instruction to calculators arranged in the expansion direction, reducing the cost required to develop software for the control. The method is especially suitable for pixel process in which each PE operates in the same manner.

However, if one instruction should be used to instruct all the PEs, the instruction length is too large and unrealistic. Accordingly, instructions are issued in units of lines (or columns), as shown in FIG. 3B.

Use of SIMD has greatly reduced the number of instructions, compared with the case where independent calculation instructions are respectively issued to the PEs. However, the array, which is used for the aforementioned motion vector detection process and the image recognition process, is large in scale. Even an instruction for the number of lines (or columns) has a large influence on the instruction memory size or the instruction decoder. Basically, it requires as many instruction memories and instruction decoders as the number of lines.

The two dimensional array calculation device of the present invention is intended to reduce the instruction memory size or the like by including only one instruction memory and one instruction decoder and further by reducing the instruction length, to restrict the increase of LSI in the area, eventually.

In addition, the method realizes the flexibility with which, for example, algorithms can be changed easily in the MPEG encoding process.

The following will describe the two dimensional array calculation device in the present embodiment of the present invention.

the two dimensional array calculation device in the present embodiment performs a motion vector detection process in the MPEG encoding process.

<Motion Vector Detection>

The motion vector detection process will be described briefly with reference to FIG. 1.

FIG. 1 shows a detection method for use in the motion vector detection process.

A target screen 20 is a current encoding target frame. A target image 200 is what is called macro block.

A reference screen 10 is a past or future frame for use in calculating a motion vector. A reference image 100 is an area in which the target image 200 is searched for.

A portion of the reference image 100 that has the highest degree of similarity with the macro block is searched for, by shifting the portion by one pixel in sequence from the upper left to the bottom right (reference image 100-1, reference image 100-2).

Figure 2A:
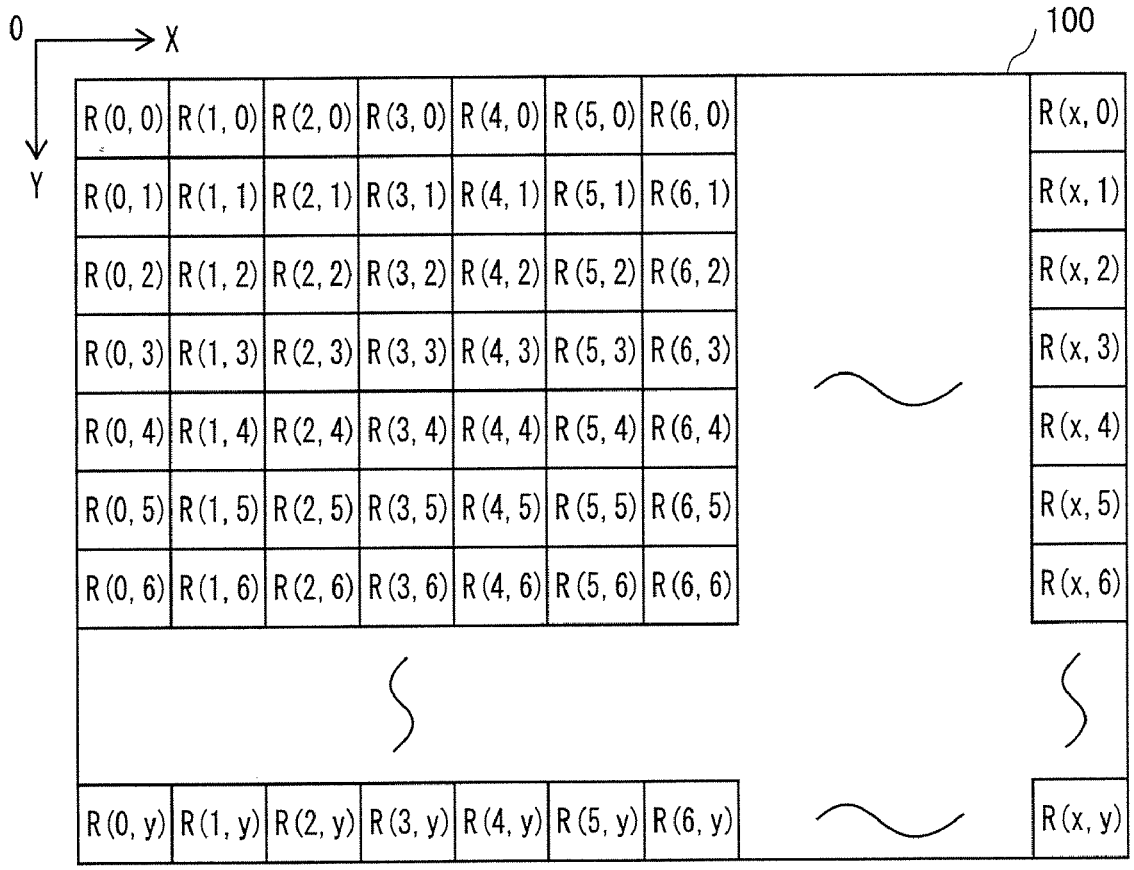
FIG. 2A shows the construction of the reference image 100.
Figure 2B:
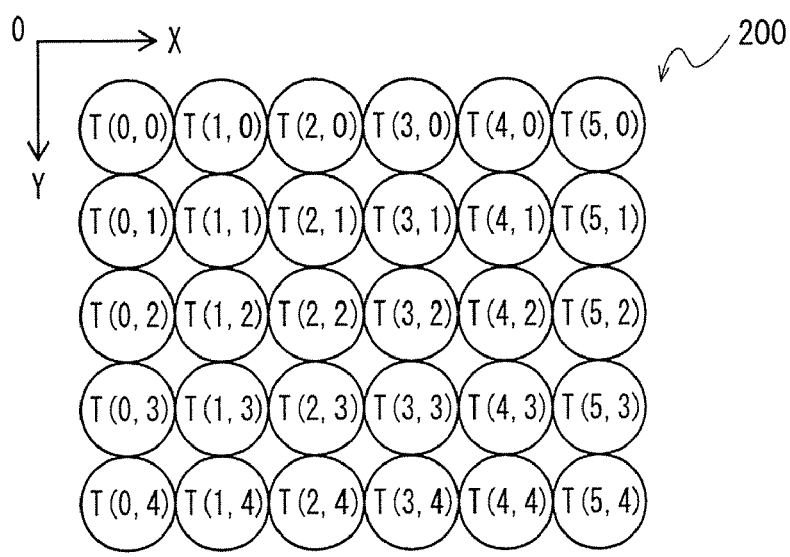
FIG. 2B shows the construction of the target image 200.

FIGS. 2A and 2B show constructions of the reference image 100 and the target image 200.

FIG. 2A shows an x-y coordinate system indicating the construction of the reference image 100, with a pixel at the upper left corner being represented as "R(0,0)". FIG. 2B shows an x-y coordinate system indicating the construction of the target image 200, with a pixel at the upper left corner being represented as "T(0,0)".

It is presumed that in the following description, "R(x,y)" or "Rxy" represent a pixel in the reference image 100, and "T(x,y)" or "Txy" represent a pixel in the target image 200. In drawings, each rectangular box represents a pixel of the reference image 100, and each circle represents a pixel of the target image 200.

<Construction>

Figure 4:
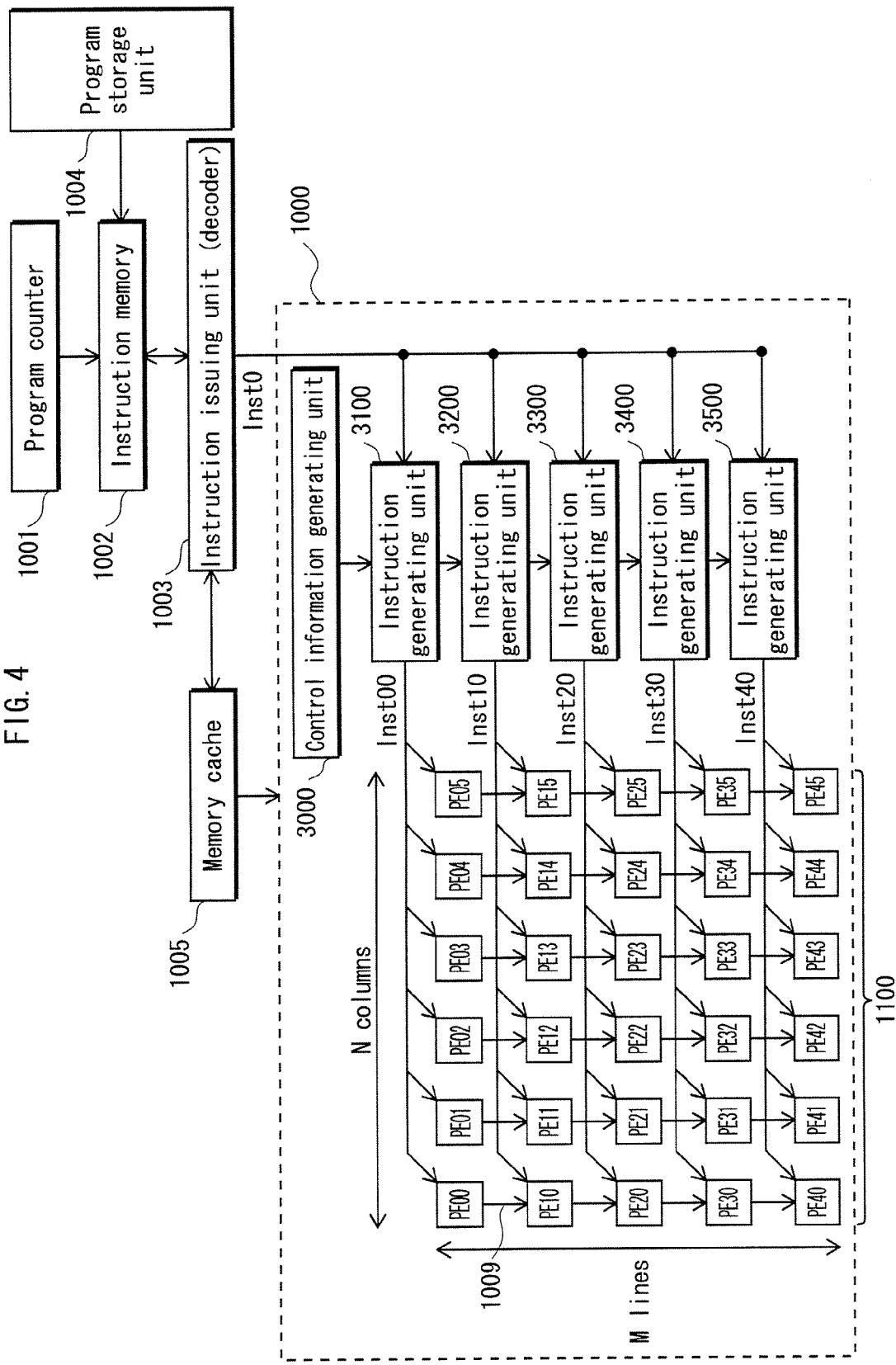
FIG. 4 shows the construction of the peripherals of the array calculation device 1000.
Figure 5:
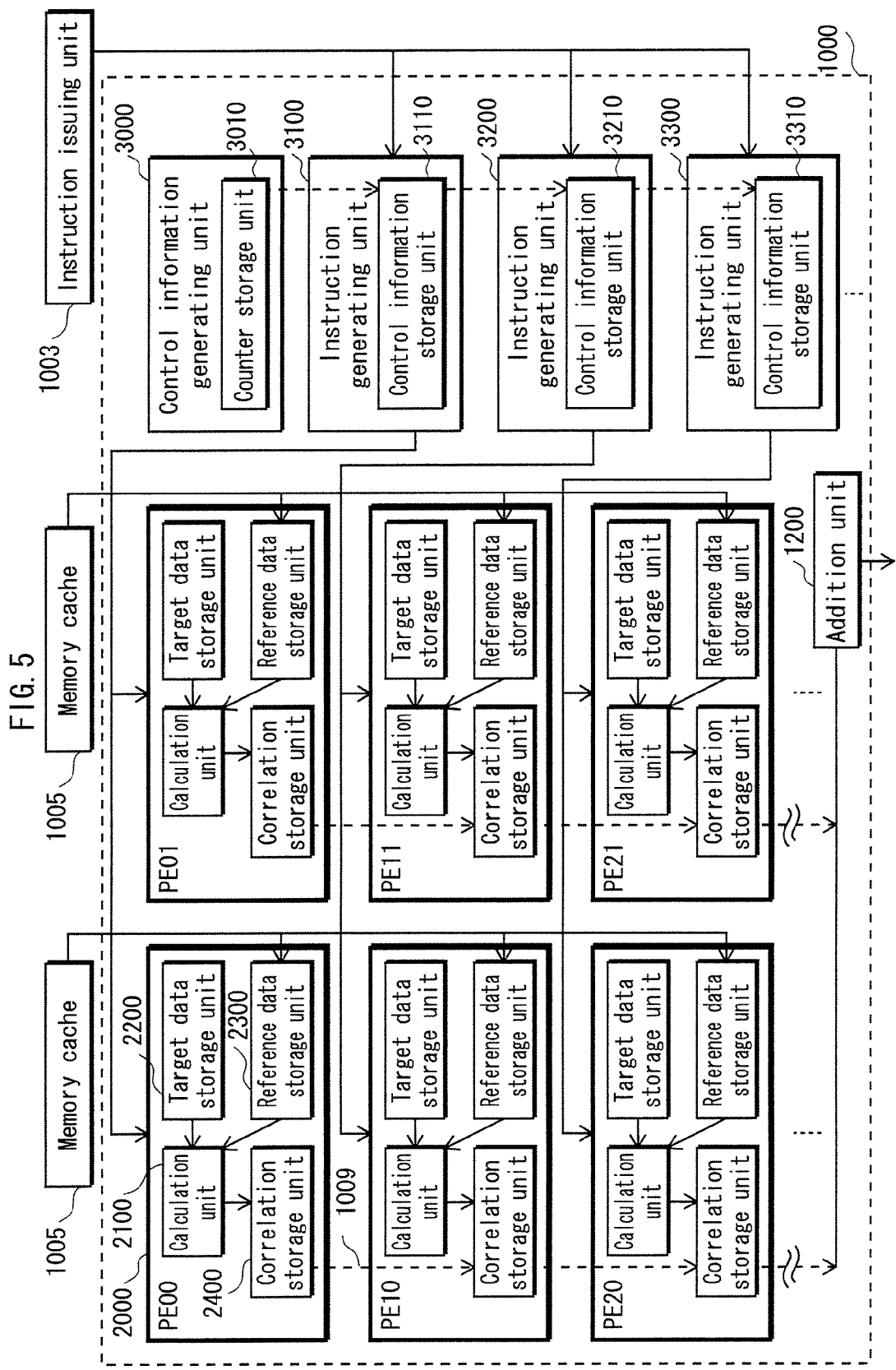
FIG. 5 shows a detailed construction of the array calculation device 1000.

The following will describe the construction of a two dimensional array calculation device 1000 of the present invention, with reference to FIGS. 4 and 5.

FIG. 4 shows the construction of the peripherals of the array calculation device 1000.

FIG. 4 shows a program counter 1001, an instruction memory 1002, an instruction issuing unit 1003, a program storage unit 1004, and a memory cache 1005, as well as the array calculation device 1000.

It is presumed here that each of these functional units and PEs are connected with each other by data signals which correspond in number to the transmission bits.

The program storage unit 1004 stores a software program including streams of instructions which indicate operations of the calculators. The program counter 1001 indicates an instruction stored in the program storage unit 1004 that is to be executed next.

An instruction indicated by the program counter 1001 is fetched into the instruction memory 1002. The instruction issuing unit 1003 decodes the instruction stored in the instruction memory 1002, and issues a control signal that is an instruction common to the entire array calculation device 1000.

The memory cache 1005 stores data that is used in the array calculation device 1000.

Now, the construction of the array calculation device 1000 will be described.

The array calculation device 1000 includes a PE array 1100, a control information generating unit 3000, and instruction generating units 3100-3500. The PE array 1100 is composed of 30 pieces of PEs (PE00 and the like) arranged in five lines×six columns two dimensionally.

Each PE and generating unit is connected to each other by buses such that a signal can be transferred among them. Each generating unit is achieve by a logical circuit.

The array calculation device 1000 has two features. One of the features is that to control the 30 pieces of PEs by one instruction (Inst0) input from the external instruction issuing unit 1003, the array calculation device 1000 includes the control information generating unit 3000 and the instruction generating units (3100 and the like) for generating instructions (Inst00-Inst40) for each line, as will be described below. The other feature is that each PE is connected not only in the line direction, but in the column direction via buses 1009 so that data transmission/reception among them is available.

Each functional unit will be described with reference to FIG. 5.

FIG. 5 shows a detailed construction of the array calculation device 1000. It should be noted here that FIG. 5 shows PEs and the like that constitute only part of the array calculation device 1000, for the sake of convenience.

The array calculation device 1000 includes a plurality of PEs 2000, a control information generating unit 3000, a plurality of instruction generating units (3100 and the like), and an addition unit 1200.

In each cycle, the control information generating unit 3000 issues control information and the instruction issuing unit 1003 issues instruction information. Here, the cycle means a predetermined clock cycle that is used as the standard in processing (the same is applied in the succeeding description).

The control information generating unit 3000 includes a counter storage unit 3010 in which a counter is stored. The control information is generated in accordance with the value of the counter. It is presumed here that the counter storage unit 3010 also stores the latest control information that was generated last.

The control information generated here becomes the base in controlling the operation of each PE.

The instruction generating unit 3100, upon receiving the instruction information issued from the instruction issuing unit 1003 and the control information issued from the control information generating unit 3000, generates an instruction for controlling the operations of PEs of one line (PE00 to PE05) in the PE array 1100.

For generating the instruction, first the instruction generating unit 3100 generates control information for the instruction generating unit 3100 itself based on the control information received from the control information generating unit 3000, and generates the instruction for controlling the PEs based on the generated control information for the instruction generating unit 3100 itself. Alternatively, the instruction generating unit 3100 generates the instruction before the transmission of the control information. That is to say, the received control information is different from the transmitted control information.

However, the received control information and the transmitted control information may be the same, depending on the purpose of the operation. For example, in Embodiment 1, the control information is used as it is, while in Embodiment 4 which will be described later, the received control information is modified before it is transmitted to the next instruction generating unit.

Further, the instruction generating unit 3100 includes a control information storage unit 3110 for storing control information received from the control information generating unit 3000. The control information stored in the control information storage unit 3110 is transmitted to the instruction generating unit 3200 before new control information is stored therein. The instruction generating unit 3200 generates an instruction based on the control information received from the instruction generating unit 3100.

The instruction generating units (3200, 3300, 3400, 3500) have the same function as the instruction generating unit 3100, but are different therefrom in that each of the instruction generating units generates an instruction for controlling the operations of PEs of each line (PE10 to PE15 or the like), using the control information received from the immediately preceding instruction generating unit, not using the control information issued from the control information generating unit 3000.

Each of the instruction generating units (3200 to 3500), as is the case with the instruction generating unit 3100, stores control information in the control information storage unit (3210, 3310 or the like), and transmits the stored control information before storing new control information therein.

The following will describe the PEs. Here, only PE00 (2000) will be described as a representative, since they have the same construction.

PE00 (2000) includes an calculation unit 2100, a target data storage unit 2200, a reference data storage unit 2300, and a correlation storage unit 2400.

The target data storage unit 2200 stores one pixel data of the target image 200. More specifically, each of the 30 pieces of PEs (see FIG. 4) stores data of a corresponding one of the pixels of the target image 200 (see FIG. 2B).

For example, the target data storage unit 2200 of PE00 stores data of pixel "T(0,0)", and the target data storage unit 2200 of PE10 stores data of pixel "T(1,0)".

The reference data storage unit 2300 stores one pixel data of the reference image 100 (see FIG. 2A). It should be noted here that while the target data storage unit 2200 stores one pixel data that is different for each PE, the reference data storage unit 2300 stores data that is different for each column. That is to say, the reference data storage units 2300 in the same column store the same data.

The reference data storage unit 2300 stores the reference data that is read from the memory cache 1005.

For example, the reference data storage units 2300 of PE00 and PE10 store data of pixel "R00", while the reference data storage units 2300 of PE01 and PE11 store data of pixel "R10".

The calculation unit 2100 calculates the strength of the correlation between the target data stored in the target data storage unit 2200 and the reference data stored in the reference data storage unit 2300, and stores the calculation result in the correlation storage unit 2400. The strength of the correlation is determined using SAD (Sum of Absolute Difference).

The correlation storage unit 2400 stores data received from a PE in the immediately preceding line, as well as the result data of the calculation unit 2100 of the PE itself. The correlation storage unit 2400 also has a function to transmit the data it stores to a PE in the next line (see the buses 1009). The details will be described later with reference to FIG. 8.

The addition unit 1200 outputs, from the array calculation device 1000, a value that is a result of adding up the outputs from the PEs of the last line. The value, used as a correlation value, indicates between the target image 200 and the reference image 100 so that a motion picture vector is obtained with respect to a position in the reference image where the degree of correlation is the strongest, namely, where the sum of the absolute difference values is the smallest.

The following will describe how the array calculation device 1000 obtains the correlation value with reference to the flow of data such as the control information, and then will describe the processing flow of the array calculation device 1000.

<Obtaining Correlation>

Here will be described the procedures of the array calculation device 1000 in obtaining the correlation between the target image 200 and the reference image 100, with reference to FIGS. 6-8. In the drawings, for example, "T(0,0)" is represented as "T00" for the sake of convenience (the same is applied in the succeeding drawings).

The following will describe how to supply the reference image 100 to the PE array, how to transfer the control information, and the transition of the contents of the correlation storage unit 2400.

<Supplying Reference Image 100 to PE Array>

Figure 6:
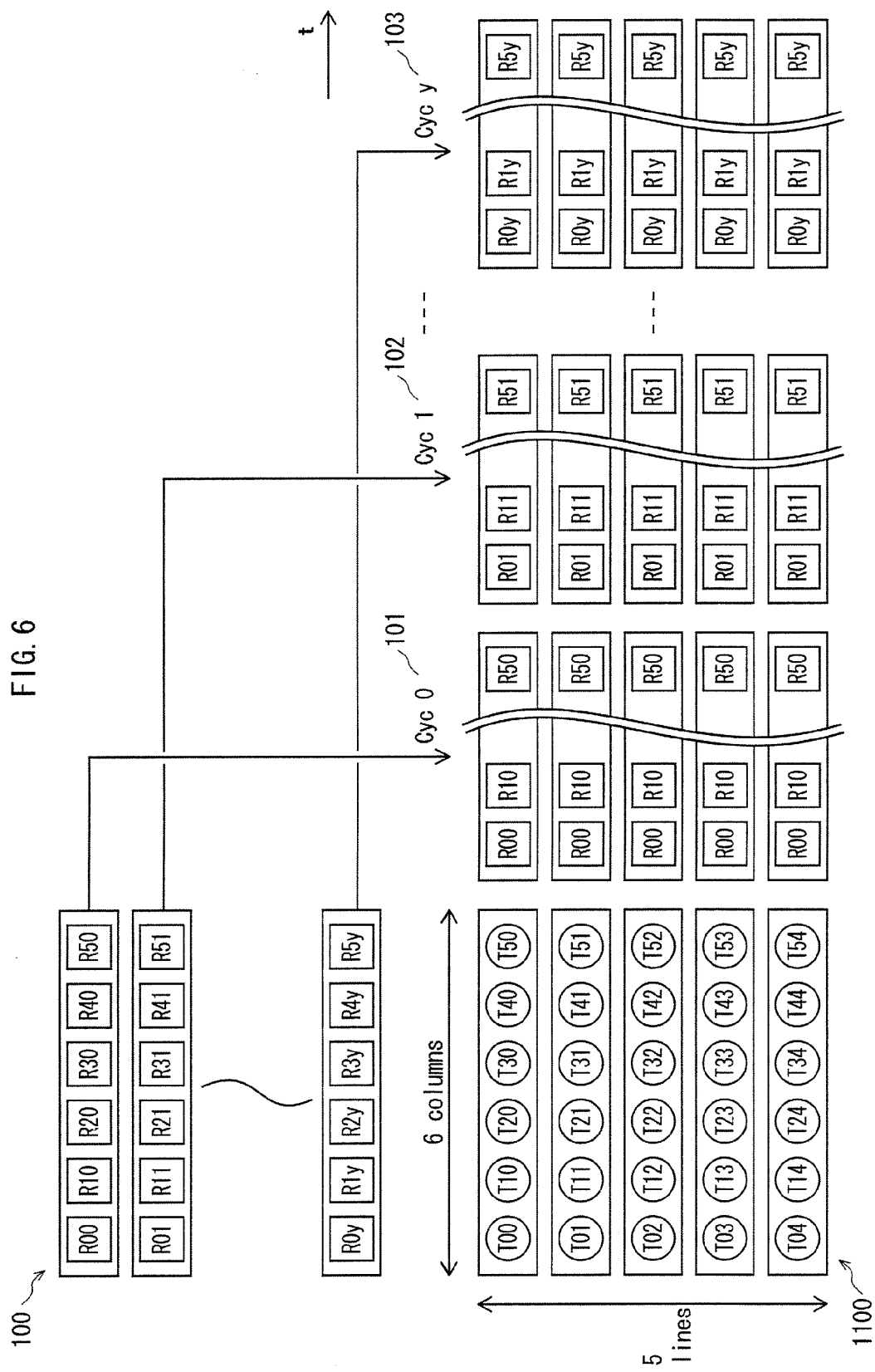
FIG. 6 shows how the reference image 100 is supplied to the PE array 1100.

FIG. 6 shows how the reference image 100 is supplied to the PE array 1100.

In the PE array 1100, the target image 200 shown in FIG. 2B is arranged in a PE array of the array calculation device 1000. More specifically, the PE array 1100 is stored in the target data storage unit 2200 (see FIG. 5).

The reference image 100 is supplied, one line by one line (horizontal line including six pixels), to the PE array of the array calculation device 1000, where the target image 200 has been held on the PE array.

For example, when the first line (R00-R50) of the reference image 100 is supplied in cycle "Cyc 0" 101, the same reference data is supplied to the PE array 1100 in a unit of column. More specifically, it is stored in the reference data storage unit 2300 (see FIGS. 5 and 7).

Similarly, when the second line (R01-R51) of the reference image 100 is supplied in cycle "Cyc 1" 102, the same reference data is supplied in a unit of line. In this way, lines are supplied until the last line (R0y-R5y) is supplied in cycle "Cyc y" 103.

<Transferring Control Information>

Figure 7:
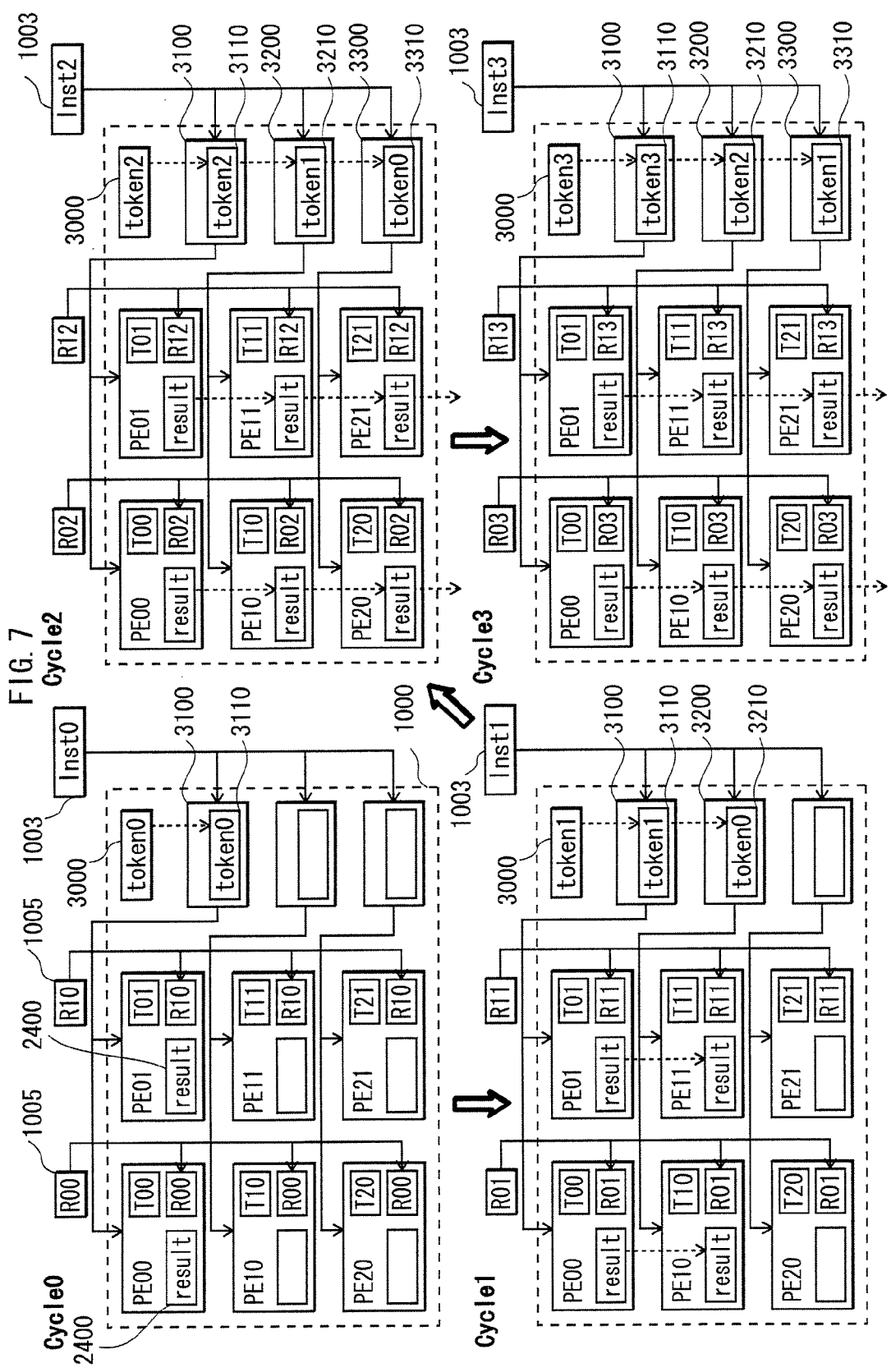
FIG. 7 shows how the control information (token) is supplied to the instruction generating units (3100 and the like).

FIG. 7 shows how the control information is supplied to the instruction generating units (3100 and the like).

FIG. 7 shows how the control information is supplied in the array calculation device 1000, in a time series from "Cycle 0" to "Cycle 3".

Note that in FIG. 7, the control information generated by the control information generating unit 3000 is represented as "token0", "token1" or the like, and the PEs and the instruction generating units (3100 and the like) include each storage unit and data stored therein. Also, arrows with dotted lines indicate transfers of the data stored in the storage units.

First, in "Cycle 0", control information "token0" generated by the control information generating unit 3000 is stored in the control information storage unit 3110 of the instruction generating unit 3100. In the actuality, the control information generating unit 3000 generates the control information in the immediately preceding cycle, and the counter storage unit 3010 stores "token1". However, it is recited as "token0" for the sake of convenience.

In this cycle, PE00 and PE00 performs a calculation and stores the calculation result into the correlation storage unit 2400.

Next, in "Cycle 1", control information "token1" generated by the control information generating unit 3000 is stored in the control information storage unit 3110 of the instruction generating unit 3100. The control information storage unit 3120 of the instruction generating unit 3200 stores control information "token0" having been stored in the control information storage unit 3110 of the instruction generating unit 3100.

As described above, "token0" is transferred in sequence in "Cycle 3" and "Cycle 4".

The instruction generating units (3100 and the like) are to generate instruction related to each line of the PE array, based on the control information "token0" and the like and the instruction "Inst0" and the like issued from the instruction issuing unit 1003.

It should be noted here that "result" in the correlation storage unit 2400 of the PE represents the calculation result. The details will be described later.

<Transition of Contents of Correlation Storage Unit 2400>

Figure 8:
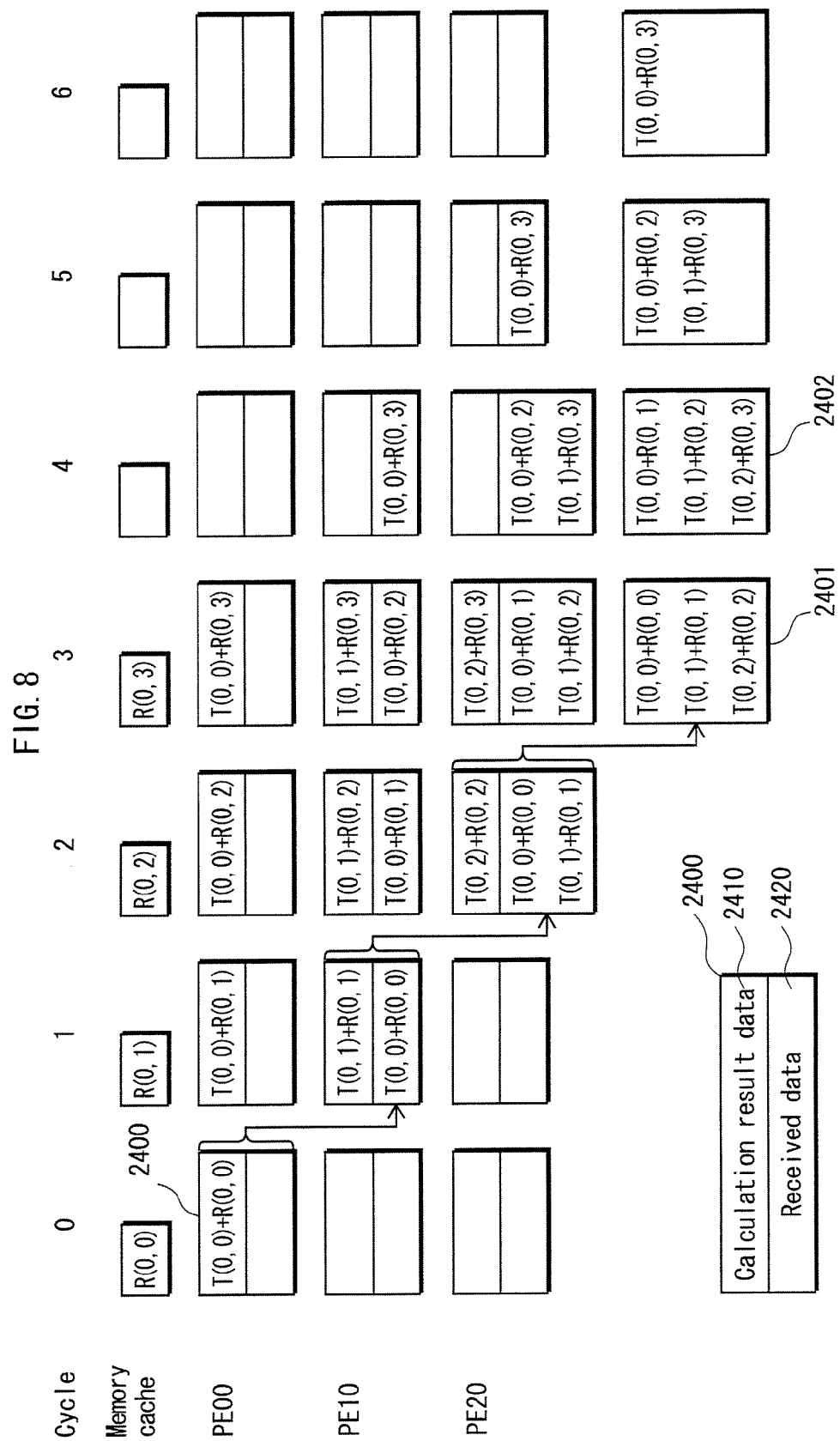
FIG. 8 shows a transition of the contents of the correlation storage unit 2400 of each PE.

FIG. 8 shows a transition of the contents of the correlation storage unit 2400 of each PE.

This example shows how the contents of the correlation storage unit 2400 of each PE are transferred to the correlation storage unit 2400 of the PEs in the next line, in sequence in a time series.

Also, the drawing shows only the correlation storage units 2400 in PEs of one column. This is because each column is operated in the same manner. Also, the drawing shows only the contents of the correlation storage unit 2400 of each PE in the first column in the PE array shown in FIG. 7.

Here, for the sake of convenience, it is presumed in the following description that the target image 200 is composed of three pixels: "T(0,0)", "T(0,1)", and "T(0,2)", and that the reference image 100 is composed of four pixels: "R(0,0)", "R(0,1)", "R(0,2)", and "R(0,3)". Accordingly, the PE array is explained as being composed of "PE00", "PE10", and "PE20". The contents of the correlation storage unit 2400 include two types of data: calculation result data 2410 being a result of calculation by the calculation unit 2100 of the PE itself; and received data 2420 being data sent from the PE in the immediately preceding line.

In the actuality, a sum of correlation value between the target data and reference data is stored. However, this example shows correlated pixels to clearly indicate the contents. For example, "T(0,0)+R(0,0)" represents a correlation value of "T(0,0)" and "R(0,0)", and "T(0,0)+R(0,0) T(0,1)+R(0,1)" represents a sum of a correlation value of "T (0,0)" and "R(0,0)" and a correlation value of "T(0,1)" and "R(0,1)".

In "Cycle 0", "T(0,0)+R(0,0)" is stored in the calculation result data 2410 of the correlation storage unit 2400 of "PE00", and no data is stored in the received data 2420. This is because there is no PE in the immediately preceding line.

Next, in "Cycle 1", "T(0,0)+R(0,1)" is stored in the calculation result data 2410 of the correlation storage unit 2400 of "PE00", and no data is stored in the received data 2420.

Also, "T(0,1)+R(0,1)" is stored in the calculation result data 2410 of the correlation storage unit 2400 of "PE01", and a sum of the calculation result data 2410 and the received data 2420 of the correlation storage unit 2400 of "PE00" in "Cycle 0" is stored in the received data 2420.

In this way, a sum of the calculation result data 2410 and the received data 2420 is transferred to the PE in the next line.

As a result of this, the sum of the calculation result data 2410 and the received data 2420 transmitted from the PE in the last line, namely PE20 in this example, is a correlation value 2401 between one line of the object image and one line of the reference image.

More specifically, it is a correlation value between "T (0,0)", "T (0,1)", "T (0,2)" and "R(0,0)", "R(0,1)", "R(0,2)".

In the next cycle, the sum of the correlation values transmitted from the PE in the last line is a correlation value 2402 between the target image and a reference image that is shifted by one pixel.

More specifically, it is a correlation value between "T(0,0)", "T(0,1)", "T(0,2)" and "R(0,1)", "R(0,2)", "R(0,3)".

In this way, each correlation value between one line of the target image 200 and one line of the reference image 100 shifted by one pixel in the Y direction is output in sequence.

It should be noted here that although this description has explained one column, a correlation value between the target screen and the reference screen is obtained by adding up the outputs of each line.

<Process Flow of Array Calculation Device>

The operation of the array calculation device 1000 will be described with reference to FIGS. 9-13.

Figure 18:
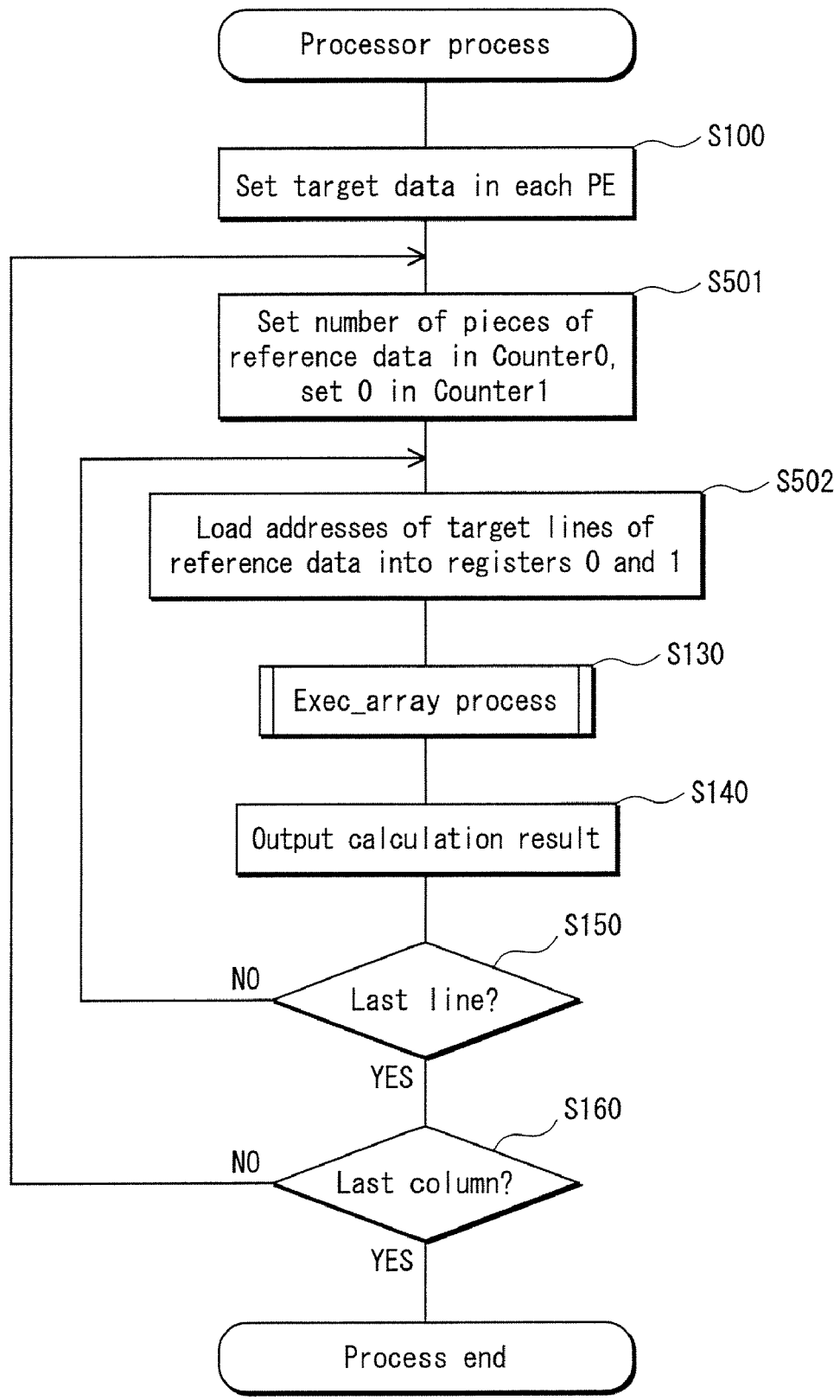
FIG. 18 is a flowchart showing the procedures of obtaining a correlation between the target image 200 and the reference image 100, in the array calculation device 1000 of Embodiment 3.

The functional units for executing these processes are achieved by sequential logic circuits, and execute the following processes (This also applies to FIG. 18 and the like).

Figure 9:
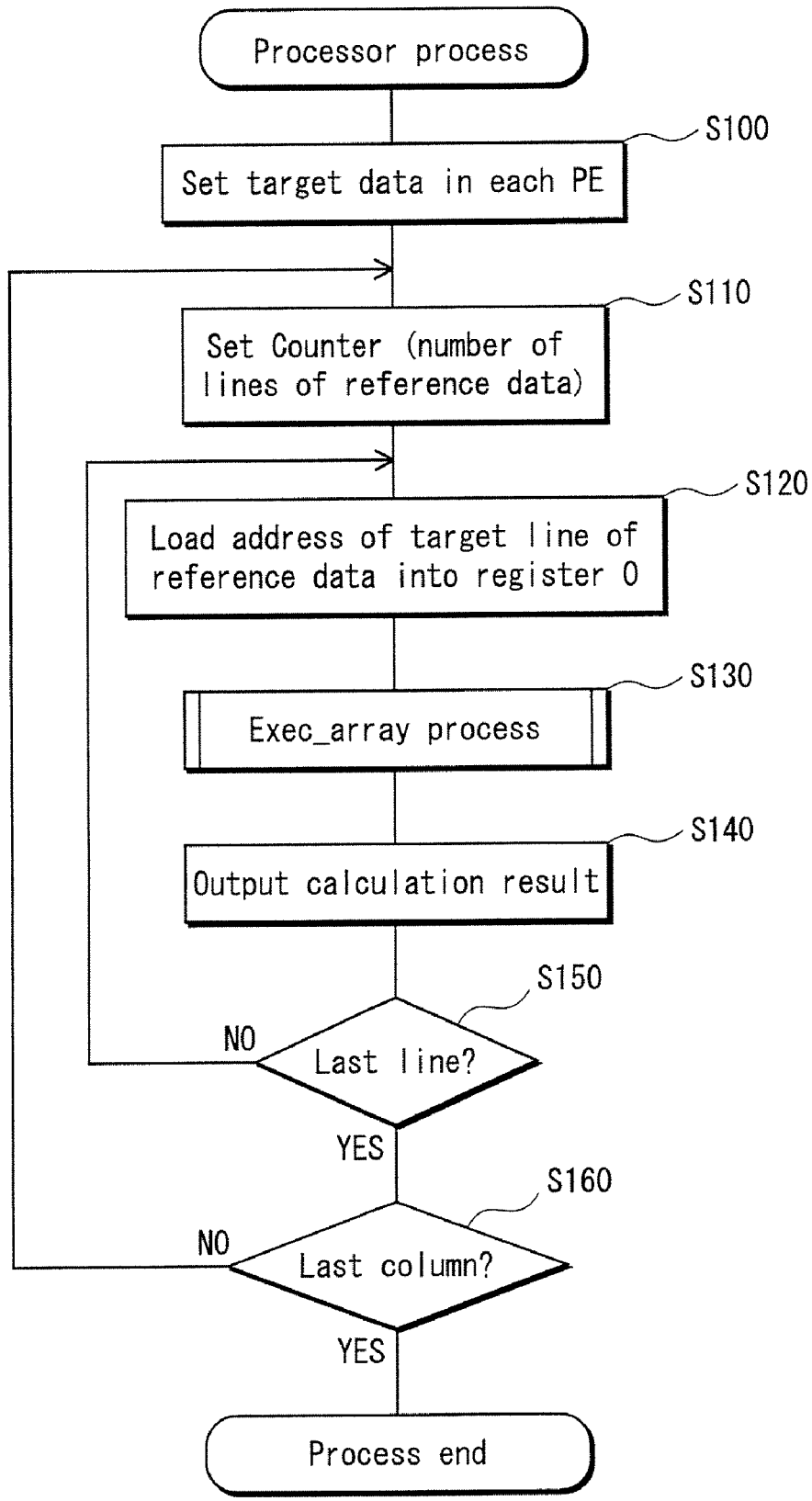
FIG. 9 is a flowchart showing the procedures of obtaining a correlation between the target image 200 and the reference image 100, in the array calculation device 1000 of Embodiment 1.

FIG. 9 is a flowchart showing the procedures in the array calculation device 1000 of obtaining a correlation between the target image 200 and the reference image 100. In this process, a position in the reference image 100 that has the highest degree of correlation with one macro block, namely the target image 200, is searched for by shifting the reference image 100 by one pixel in sequence.

First, target data is read from the target image 200 into the target data storage unit 2200 of each PE (step S100, see FIG. 6).

A value is set in the counter storage unit 3010 of the control information generating unit 3000 (step S110). The value to be set here is the number of lines of the reference image 100. For example, "8" is set.

Next, a starting address of one line of the reference image 100 to be supplied to the array calculation device 1000 is loaded into register 0 (step S120). Note that the load destination is not limited to register 0, but depends on the system.

For example, when "R00", "R10", . . . "R50" is supplied (see FIG. 6), the address of pixel data "R00", which is stored in the memory cache 105, is loaded. When the address is not stored, the process of reading it into the memory cache is performed.

After the address of the reference image is loaded into register 0, the process of obtaining the correlation with the target image 200 is performed (step S130). The process is executed when the instruction issuing unit 1003 issues "exec_array" as the instruction.

When the "exec_array" is executed, a correlation between one line of the reference image 100 and all lines of the target image 200 is obtained. For example, the reference data supplied in the $0^{th}$ cycle 101 in FIG. 6 and the target image 200 in the PE array 1100 are calculated.

After the "exec_array" process, a value obtained by the addition unit 1200 by adding up the outputs of the PEs of the last line of the PE array 1100 is output (step S140).

If the calculation has not reached the last line of the reference image 100 (NO in step S150), the process is repeated after setting the address of the next line in register 0 (for example, after setting the address of pixel data "R01") (steps S120 to S140).

It should be noted here that when calculation reaches the last line of the reference image 100, it means that the calculations are performed until the calculation for the target image T(x,0) and the reference image R(x,8) has been completed. More specifically, the "exec_array" process is performed 13 times, which is a sum of the number of lines of the reference image and the target image.

After the calculations up to the last line of the reference image 100 are completed (YES in step S150), the calculations are performed for the next column (steps S110-S150).

The address of pixel data "R10" among six pixels "R10", "R20", . . . "R60" after shifting the reference image by one pixel rightward is loaded into register 0 (step S120), and the process is continued.

When the calculation has reached the last column of the reference image 100 (step S160), the process ends.

This completes the calculation for one macro block, namely, the target image 200. Then, a motion vector is calculated on a position that has the strongest correlation among the calculation results output in step S140.

Next, the "exec_array" process will be described with reference to FIG. 10.

Figure 10:
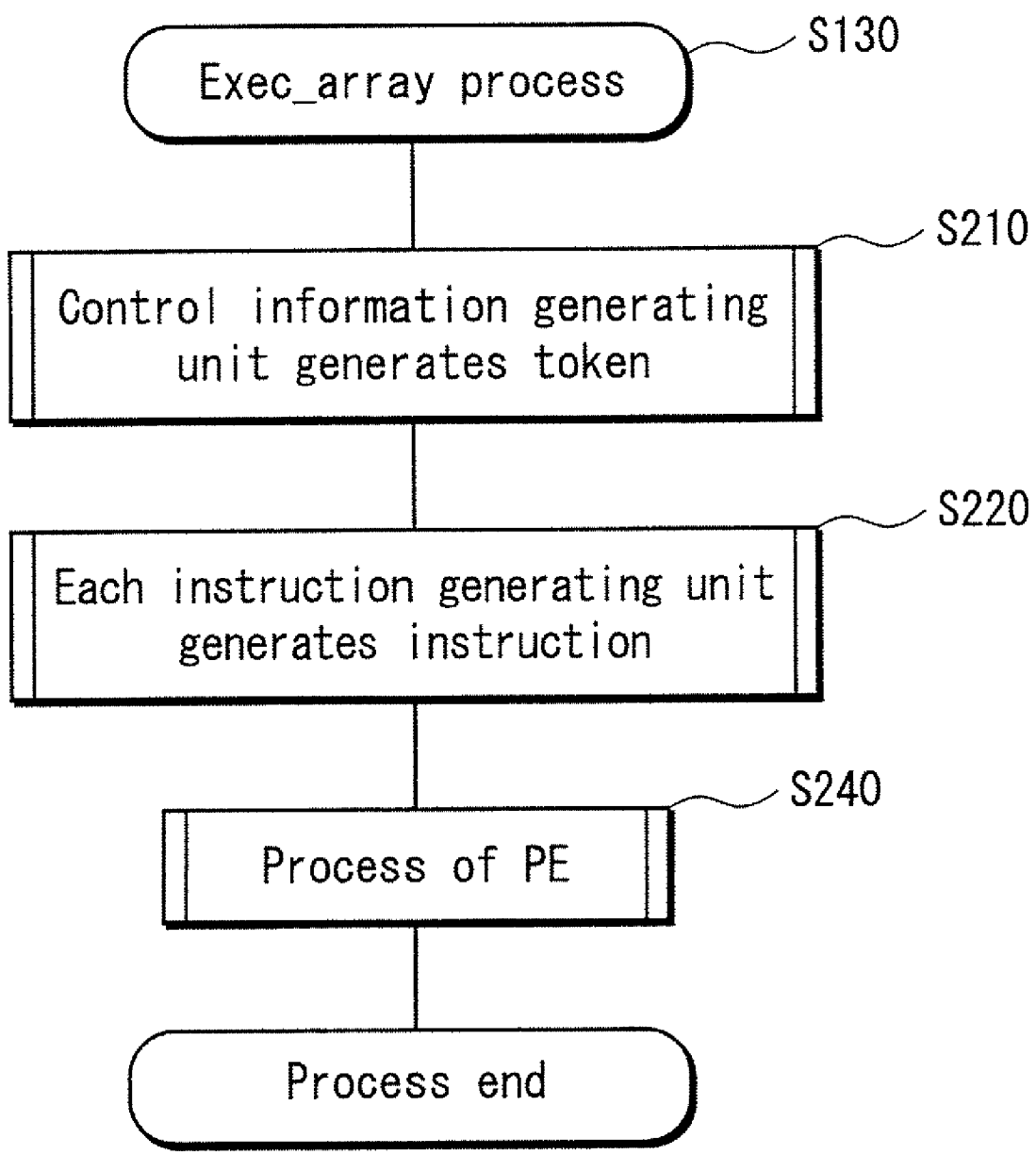
FIG. 10 is a flowchart showing the "exec_array" process in Embodiment 1.

FIG. 10 is a flowchart showing the "exec_array" process.

First, the control information generating unit 3000 generates new control information (token), and each of the instruction generating units (3100 and the like) transmits the control information stored therein to the next instruction generating unit (step S210).

Upon receiving the control information, each instruction generating unit generates an instruction using the "exec_array" instruction issued from the instruction issuing unit 1003 and the control information stored in each control information storage unit (3110 or the like), and transmits the generated instruction to the PE of the corresponding line (step S220).

Upon receiving the generated instruction, each PE performs a calculation process (step S240).

These three processes are performed in parallel, in corresponding cycles that are shifted by one cycle, respectively.

Here, the process performed by each PE will be described with reference to FIG. 11.

Figure 12A:
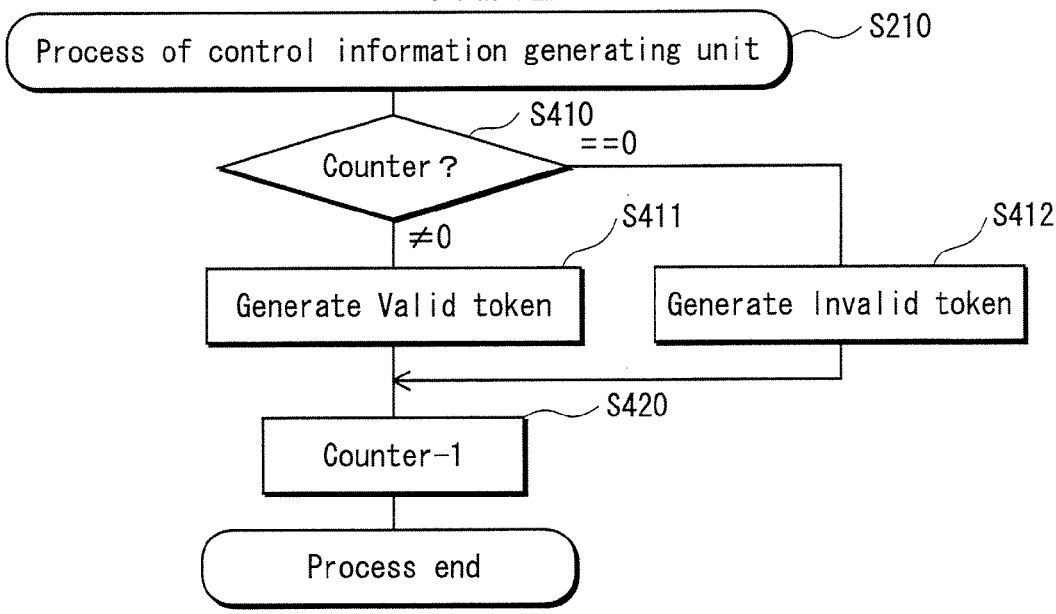
FIG. 12A is a flowchart showing the process of the control information generating unit in Embodiment 1.

The process of the control information generating unit 3000 in step S210 and the process of the instruction generating units (3100 and the like) in step S230 will be described later in detail with reference to FIGS. 12A and 12B.

Figure 11:
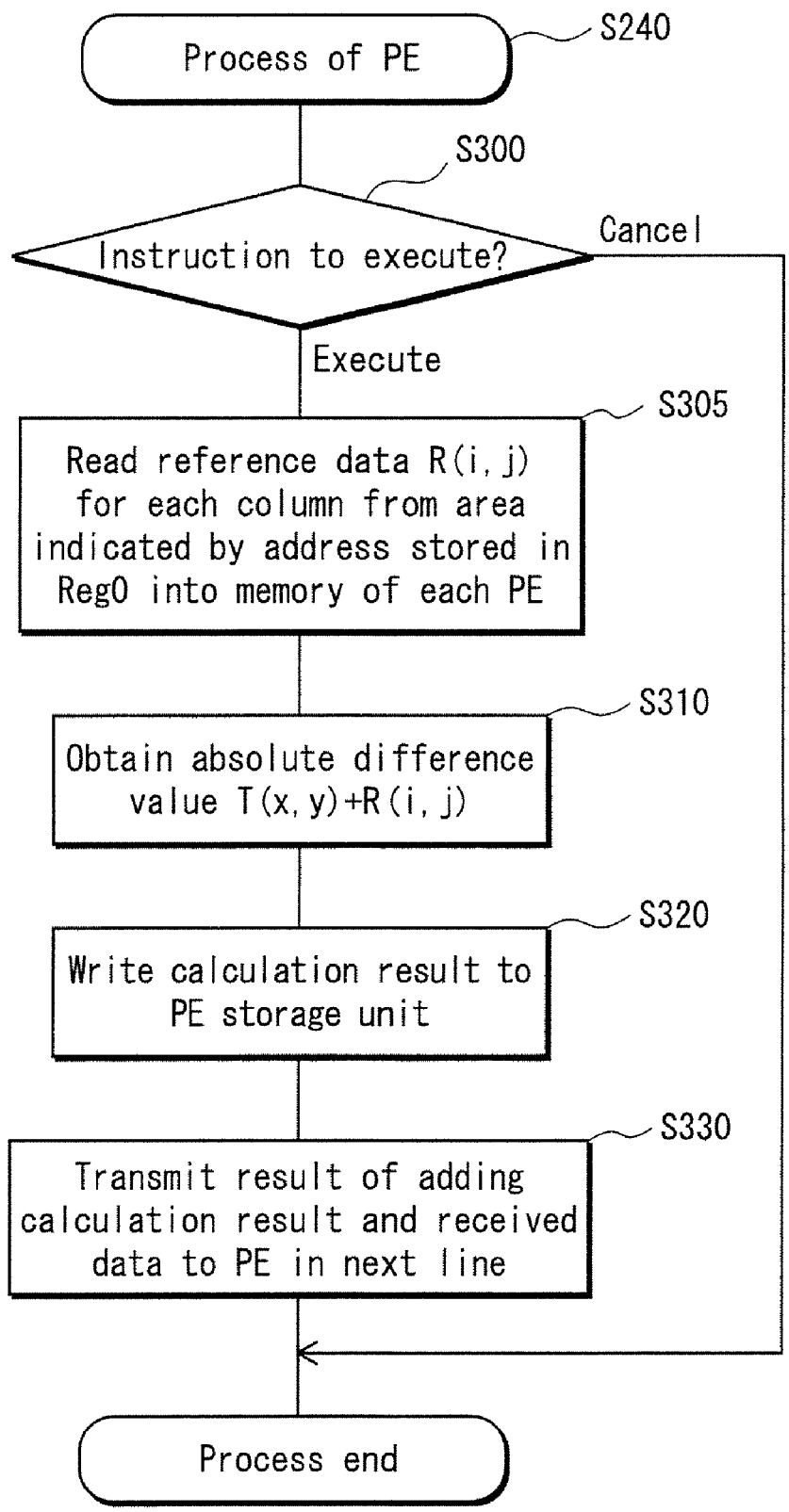
FIG. 11 is a flowchart showing the process performed by each PE in Embodiment 1.

FIG. 11 is a flowchart showing the process performed by each PE.

If an instruction received from an instruction generating unit (3100 or the like) is an instruction to execute (EXECUTE in step S300), the PE refers to an area in the memory cache 1005 indicated by register 0, and reads the reference data into the reference data storage unit 2300 of the PE itself (step S305). More specifically, the data, which was written there by the instruction issuing unit 1003 when the instruction was decoded, is read from the memory that corresponds to a column of the PE array.

Next, the calculation unit 2100 obtains an absolute difference value between the target data of the target data storage unit 2200 and the reference data of the reference data storage unit 2300 (step S310), and stores the obtained absolute difference value into the calculation result data 2410 of the correlation storage unit 2400 (step S320, see FIG. 8).

After this, the PE adds the calculation result data to the received data 2420, and transmits the addition result data to the PE in the next line. Upon receiving the addition result data, the PE in the next line stores the received data into the received data 2420 of the PE itself.

On the other hand, if an instruction received from an instruction generating unit (3100 or the like) is an instruction to cancel (CANCEL in step S300), the PE ends the process without any operation.

Next, the process of the control information generating unit 3000 and the process of the instruction generating units (3100 and the like) will be described with reference to FIGS. 12A and 12B. These process are performed in the same cycle.

First, the process of the control information generating unit 3000 will be described with reference to FIG. 12A. FIG. 12A is a flowchart showing the process of the control information generating unit.

It is presumed here that the generated control information is either "Valid" or "Invalid".

If the value of the counter stored in the counter storage unit 3010 (refer to FIG. 9: step S110) is 0 ("=0" in step S410), the control information generating unit 3000 generates an "Invalid" token (step S412); and if the value of the counter is not 0 ("≠0" in step S410), the control information generating unit 3000 generates a "Valid" token (step S411). The generated token is transmitted to the instruction generating unit 3100 and is stored in the control information storage unit 3110.

After the control information generating unit 3000 generates a token, the control information generating unit 3000 decrements the counter by 1. In this step, if the result of the decrement is to be less than 0, the counter is set to 0.

Next, the process of the instruction generating units (3100 and the like) will be described with reference to FIG. 12B. Each of the instruction generating units (3100 and the like) operates in the same way as described in the following.

Figure 12B:
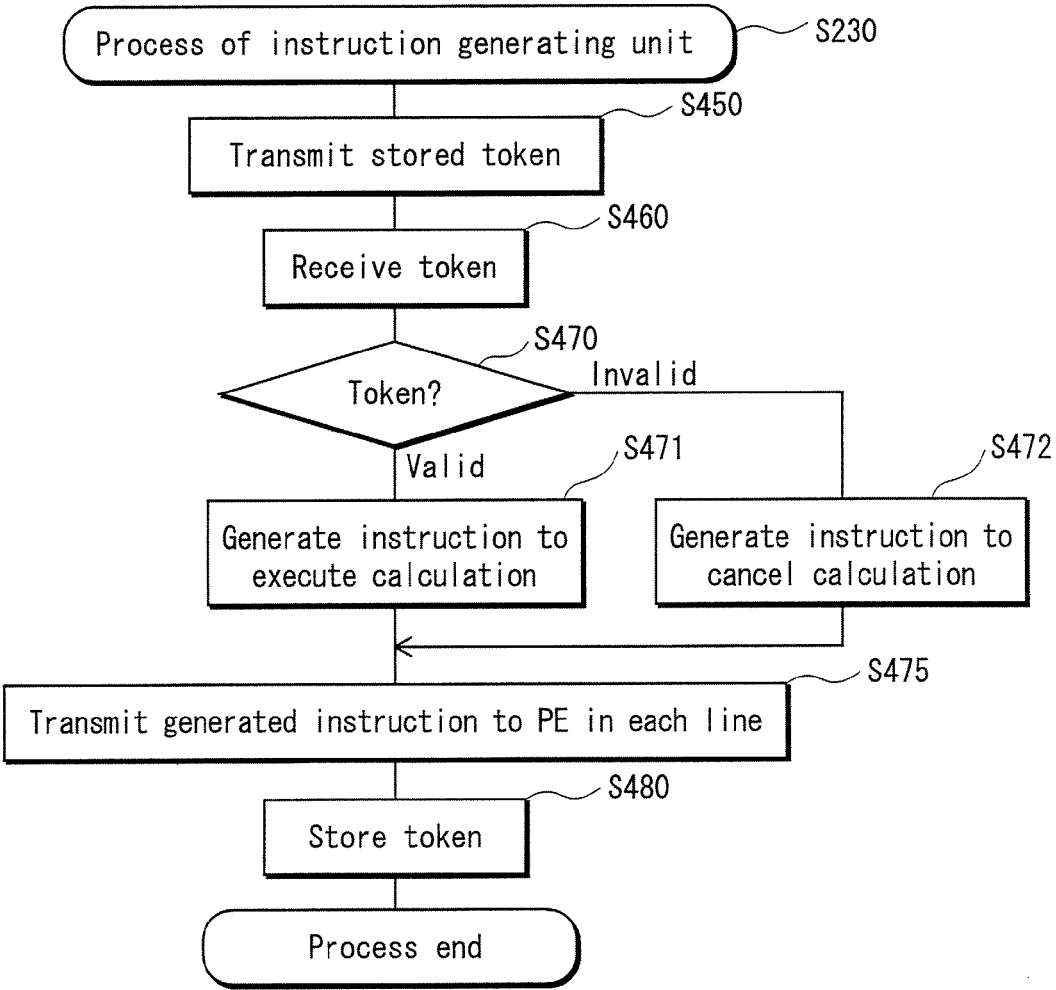
FIG. 12B is a flowchart showing the process of the instruction generating unit in Embodiment 1.

FIG. 12B is a flowchart showing the process of an instruction generating unit.

First, the instruction generating unit transmits the token stored in the control information storage unit 3110 to the next instruction generating unit (step S450), and receives a token from the preceding instruction generating unit or control information generating unit (step S460).

The instruction generating unit generates an instruction that is to be executed by a PE, based on the received token.

If the received token is "Valid", the instruction generating unit generates an instruction that instructs to execute the "exec_array" instruction (step S471); and if the received token is "Invalid", the instruction generating unit generates an instruction that instructs to cancel the "exec_array" instruction (step S472).

That is to say, it is possible to control whether to execute or not, in a unit of line of the PE array, depending on the value of token.

The generated calculation instruction is transmitted to each PE, and the token is stored in the control information storage unit 3110.

The following will describe the relationship between the token generated by the control information generating unit 3000 and the execution by PEs.

Figure 13:
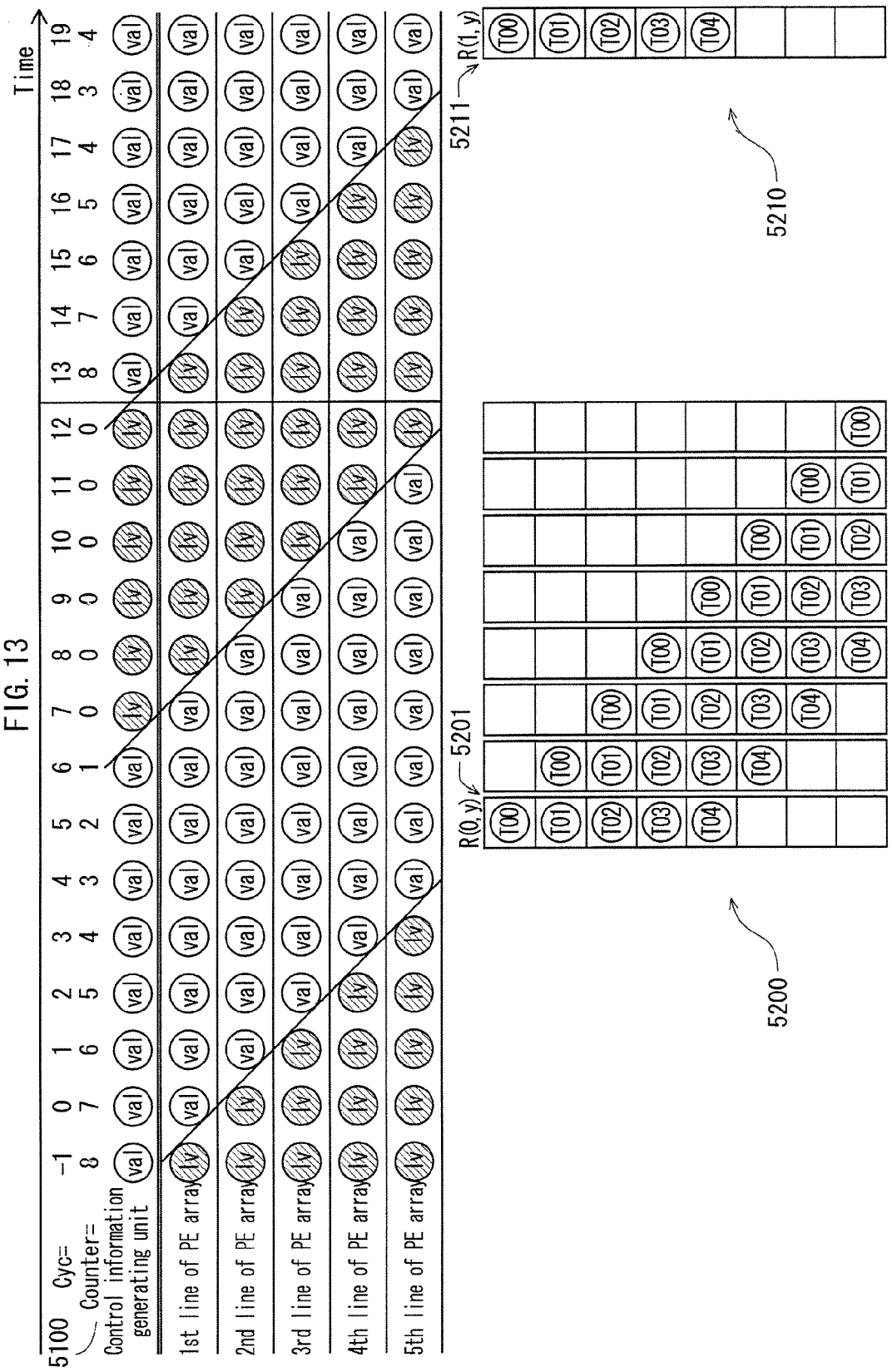
FIG. 13 shows tokens and operations of PEs on a time axis in Embodiment 1.

FIG. 13 shows tokens and operations of PEs on a time axis.

The drawing shows, as a horizontal axis, a time axis in a unit of cycle, along with the operations of the control information generating unit 3000 and the operations of the $1^{st}$ to $5^{th}$ lines in the PE array 1100.

It is presumed here that each circle in FIG. 13 represents a token on which an instruction is based, in this example, it is a token stored in the counter storage unit 3010 or in the control information storage unit (3110 or the like), and that "val" represents Valid, and "Iv" represents Invalid. That is to say, PEs in a "val" line perform calculations, and PEs in an "Iv" line do not perform calculations.

Also, the drawing shows only the operation of the PEs in the first column. This is because each column is operated in the same manner.

The tables shown in the lower part of the drawing are calculation results (5200, 5210). The tables indicate the pixels for which a correlation between the target image and the reference image was obtained.

In cycle "Cyc=−1", a counter 5100 is "8", and a "Valid" token is generated. At this time, no PE is executed.

In cycle "Cyc=0", the counter 5100 is "7", and a "Valid" token is generated. By this time, the token generated in cycle "Cyc=−1" has been moved to the PE in the first line of the PE array. Accordingly, only the PE in the first line of the PE array is executed.

That is to say, a calculation is performed to obtain an absolute difference value between (i) data "T00", "T10", "T20", "T30", "T40", and "T50" in the first line of the target image 200 that are arranged in the first line of the PE array 1100 and (ii) data "R00", "R10", "R20", "R30", "R40", and "R50" in the first line of the reference image 100 supplied to the PE array, and the result of the calculation is transferred to the calculation elements in the second line via the bus (see FIGS. 6 and 7).

Data R00-R50 in the first line of the reference image 100 has been supplied to the second to fifth lines of the PE array, but these data are not subjected to the calculation.

Similarly, in cycle "Cyc=1", the PEs in the first and second lines of the PE array are executed.

That is to say, a calculation is performed to obtain an absolute difference value between (i) data "T00", "T10", "T20", "T30", "T40", and "T50" arranged in the first line of the PE array and (ii) data "R01", "R11", "R21", "R31", "R41", and "R51" in the second line of the reference image, and the result of the calculation is transferred to the PEs in the second line via the output buses from the calculation elements. In the same cycle, a calculation is performed to obtain an absolute difference value between (i) data "T01", "T11", "T21", "T31", "T41", and "T51" in the second line of the target image that are arranged in the second line of the PE array and (ii) data "R01", "R11", "R21", "R31", "R41", and "R51" in the second line of the reference image, and a sum of the current calculation result and the calculation result of the preceding line in the preceding cycle is transferred to the PEs in the third line via the output buses from the calculation elements.

After a similar calculation operation is repeated, in cycle "Cyc=5", a calculation result 5201 that is a result of |(T00 to T50)−(R00 to R50)|+|(T01 to T51)−(R01 to R51)|+|(T02 to T52)−(R02 to R52)|+|(T03 to T53)−(R03 to R53)|+|(T04 to T54)−(R04 to R54)| is obtained as the output from the PE in the fifth line. And a value obtained by adding up these values in the horizontal direction is used as the evaluation value of the strength of the correlation.

Similarly, in cycle "Cyc=6", a calculation result of |(T00 to T50)−(R01 to R51)|+|(T01 to T51)−(R02 to R52)|+|(T02 to T52)−(R03 to R53)|+|(T03 to T53)−(R04 to R54)|+|(T04 to T54)−(R05 to R55)| is obtained as the output. And after this, evaluation values of the strength of the correlation for positions that are shifted in the vertical direction are obtained in sequence.

In cycle "Cyc=7" and after, the counter 5100 is 0, and "Invalid" tokens are generated. In cycle "Cyc=8", "Invalid" tokens have moved to the PEs in the first line of the PE array, and therefore, only the PEs in the second to fifth lines in the PE array are executed.

After the control information generating unit 3000 sets the counter to 8, generates control information for a result of adding "8" as the number of lines of the reference image, "5" as the number of lines of the target image, and "1" as the number of separators, the process for one column of the reference image is completed. As a result, in cycle "Cyc=13", the process for obtaining the correlation with pixels "R10"-"R15" in the second column of the reference image is started, and in cycle "Cyc=19", a calculation result 5211 is obtained as the output from PE in the fifth line.

With the above-described operation, it is possible to stop unnecessary calculations by executing PEs only in the periods in which calculations are required, achieving reduction in the amount of electricity consumption. In FIG. 13, power supply to the PEs in the lines corresponding to the shaded "Iv" tokens is inhibited, reducing as much amount of electricity consumption.

Next, FIG. 14 shows an example of a program.

A program instruction list 5300 shows an operation 5302 for each program instruction 5301. It also shows an operation performed depending on the value of the control information (token). In FIG. 14, "inval" represents "Invalid", and "val" represents "Valid" (this also applies to FIGS. 16, 23, and 30).

For example, for token "Invalid", "exec_array" is "nop", namely, it is not executed. Also, for token "Valid", "exec_array" is "exec", namely, it is executed.

A "ld[addr],r0" 5400 is an instruction to load the address of the reference data into register 0.

Also, an "exec_array r0" is an instruction to perform a calculation using the reference data stored in an area indicated by register 0.

Embodiment 2

The present embodiment differs from Embodiment 1 in that if the evaluation value of the strength of the correlation at a timing is equal to or greater than a predetermined value, the calculations to be performed thereafter are regarded as unnecessary and cancelled.

FIG. 15 shows tokens and operations of PEs on a time axis.

More specifically, if it is judged that a calculation result 6100 has a strength of the correlation that is equal to or greater than a predetermined value, namely, if it is judged that the calculation result 6100 being a SAD value is equal to or smaller than a predetermined value, the calculations to be performed in "Cyc 6" and after are cancelled.

From "Cyc n", a calculation for another target image starts to be performed.

In one example of the cancellation, a circuit that evaluates a SAD value outputs a signal to the instruction generating units (3100 and the like) to cause them to generate cancel instructions that instruct to stop calculations. With this construction, calculation of a calculation unnecessary portion 6200 is stopped, and reduction in power consumption is achieved.

Next, FIG. 16 shows an example of a program.

The present embodiment can be achieved using the same program instruction list 5300 and the like that were described in Embodiment 1 (see FIG. 14).

Embodiment 3

<Outline>

The present embodiment performs the same calculations as Embodiment 1, but differs therefrom in that it provides a faster execution speed.

In FIG. 13 that shows tokens and operations of PEs in Embodiment 1 on a time axis, calculations on the target image and the first column of the reference image are performed in cycles "Cyc −1" through "Cyc 12". And the calculations on the second column of the reference image are started from cycle "Cyc 13". In this case, some PEs do not perform calculations in cycles "Cyc 7" through "Cyc 17".

In the present embodiment, such PEs not performing the calculations in Embodiment 1 also perform calculations.

FIG. 22 shows tokens and operations of PEs on a time axis.

As shown in the drawing, the present embodiment is the same as Embodiment 1 in that the calculations on the first column of the reference image are performed in cycles "Cyc −1" through "Cyc 12" (see FIG. 13), but differs therefrom in that the calculations on the second column of the reference image are started from cycle "Cyc 8".

To realize this operation, it is necessary, in cycles "Cyc 9" through "Cyc 11", to read the data of the reference image into the reference data storage unit of each PE by differentiating the data of the first line of the reference image from the data of the second line.

That is to say, in Embodiment 1, the instructions issued to the PEs are classified into two types: an instruction to execute a calculation; and an instruction to cancel a calculation. On the other hand, in the present embodiment, the instructions issued to the PEs are classified into three types: an instruction to execute a calculation on the data of the first line; an instruction to execute a calculation on the data of the second line; and an instruction to cancel a calculation.

The following explains the construction and the like of Embodiment 3.

<Construction>

Figure 17:
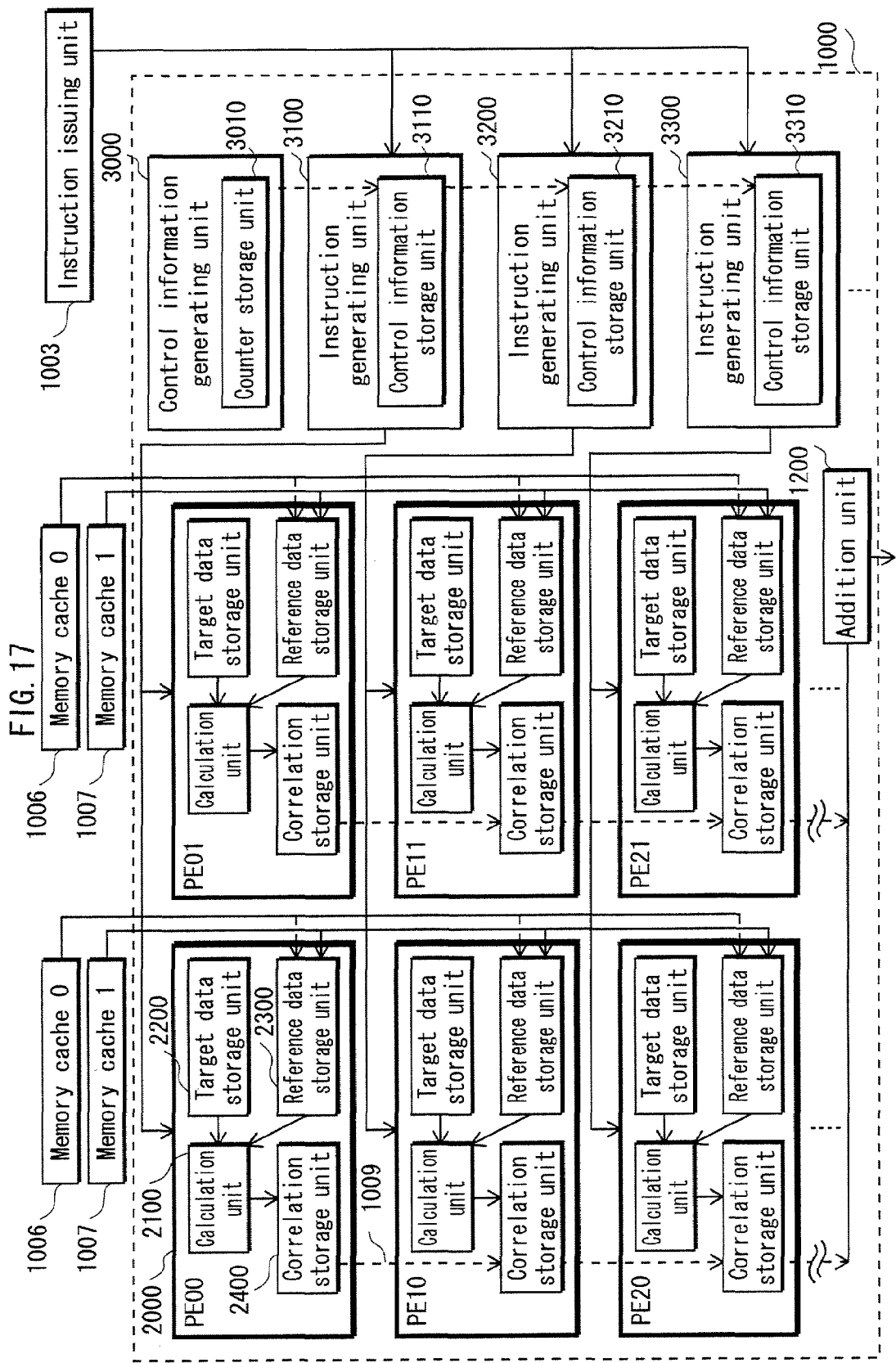
FIG. 17 shows a detailed construction of the array calculation device 1000 in Embodiment 3.

FIG. 17 shows details of the construction of the array calculation device 1000 in Embodiment 3.

Embodiment 3 differs in construction from Embodiment 1 (see FIG. 5) in that two memory caches are used. However, it is not necessary that there are two memory caches physically.

A memory cache 0 (1006) and a memory cache 1 (1007) are both connected to the reference data storage unit 2300, and each PE can select which of the memory caches to read data from.

<Operation>

Next, the process of the array calculation device 1000 in the present embodiment will be described with reference to FIGS. 18-21. The basic process flow is the same as Embodiment 1 (FIGS. 9-12), and the following description will center on the differences.

FIG. 18 is a flowchart showing the procedures in the array calculation device 1000 of obtaining a correlation between the target image 200 and the reference image 100. The process in the present embodiment differs from the process in Embodiment 1 (see FIG. 9) in that two counters are set and that two lines of data of the reference image are used.

First, target data is read from the target image 200 into the target data storage unit 2200 of each PE (step S100, see FIG. 6).

A value is set in the counter storage unit 3010 of the control information generating unit 3000 (step S501). Here, the number of lines "8" of the reference image 100 is set in "Counter0". Also, "0" is set in "Counter1". In this case, "Counter0" becomes an active counter. It should be noted here that if "8" is set in "Counter1", "Counter1" becomes an active counter.

Next, starting addresses of two lines of the reference image 100 to be supplied to the array calculation device 1000 are respectively loaded into register 0 and register 1 (step S502).

This is because there is a case where two lines of data are required. A process, in which in the middle of a calculation performed on one line, loading another line is started, is repeated alternately (see FIG. 22).

After this, the "exec_array" process is performed (step S130), the calculation result is output (step S140). The calculation process is repeated until the last line of the reference image 100 (steps S120 to S150).

When the calculation has reached the last column of the reference image 100 (step S160), the process ends.

Figure 19:
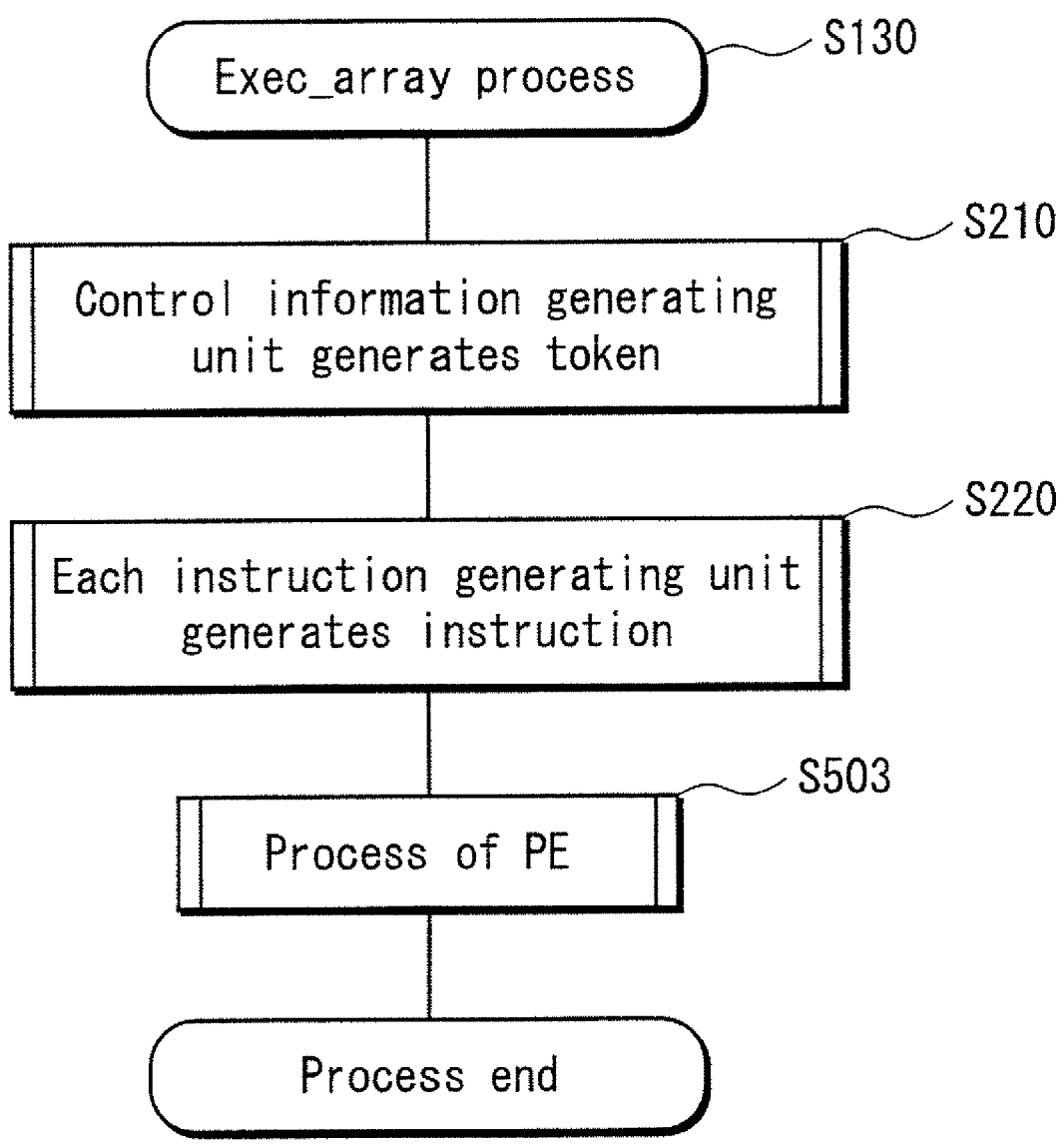
FIG. 19 is a flowchart showing the "exec_array" process in Embodiment 3.

FIG. 19 is a flowchart showing the "exec_array" process. The "exec_array" process in the present embodiment is almost the same as that in Embodiment 1 (see FIG. 10), except for the process performed by each PE (step S503).

Figure 20:
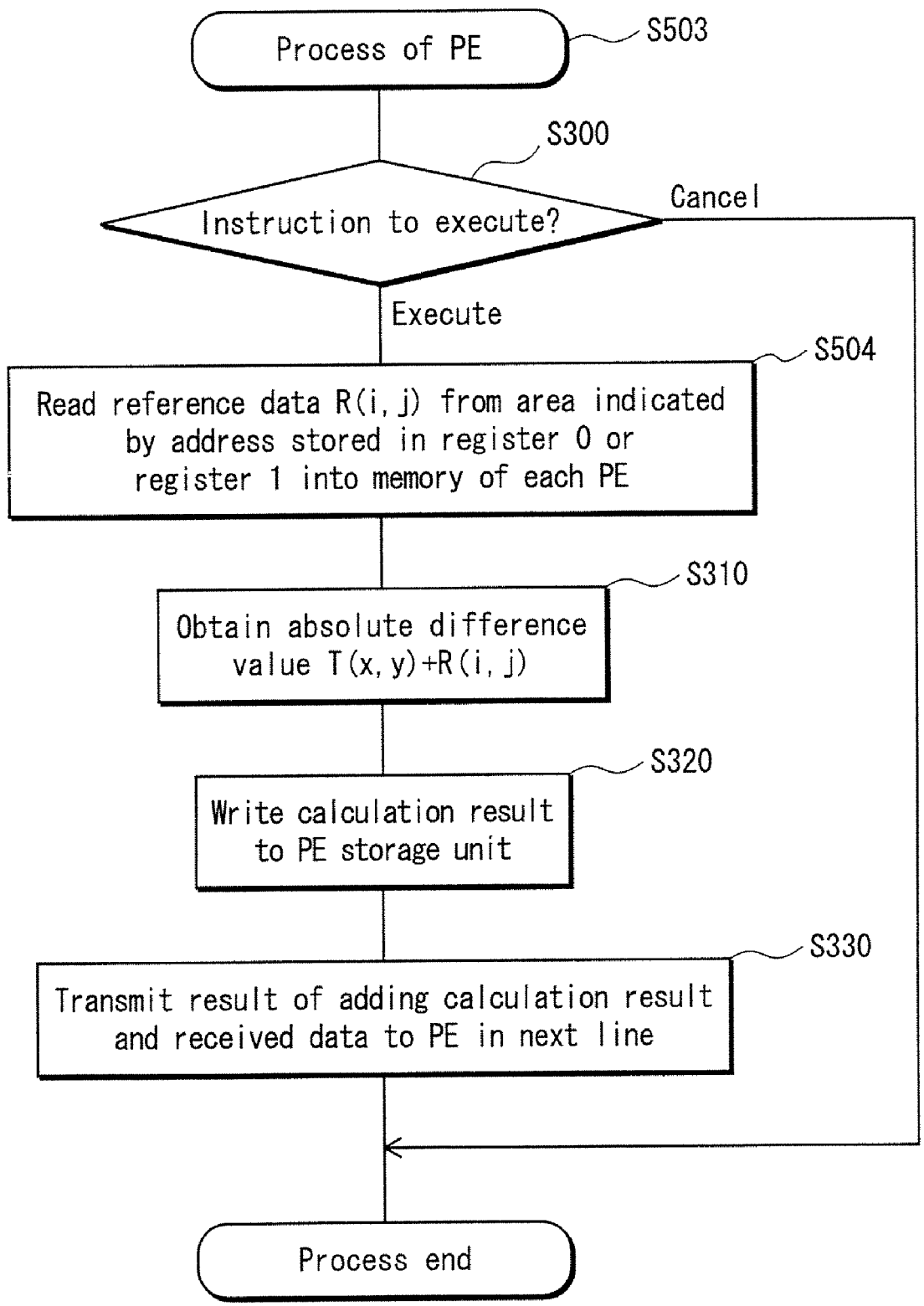
FIG. 20 is a flowchart showing the process performed by each PE in Embodiment 3.

Here will be described the process performed by each PE with reference to FIG. 20. FIG. 20 is a flowchart showing the process performed by each PE.

The process in the present embodiment differs from the process in Embodiment 1 (see FIG. 11) in that the reference data to be read into the reference data storage unit 2300 is read from either the memory cache 0 or the memory cache 1. For example, in FIG. 22, two lines of data of the reference image are required in cycles "Cyc 9" through "Cyc 11", and it is necessary to specify which data to read, for each line of the PE array.

If an instruction received from an instruction generating unit (3100 or the like) is an instruction to execute (EXECUTE in step S300), the PE reads the reference data into the reference data storage unit 2300 of the PE itself, from the memory cache 0 (1006) indicated by the register 0 or the memory cache 1 (1007) indicated by the register 1 (step S504).

Which memory cache to read data from is indicated by the instruction received from the instruction generating unit. The instruction will be described later with reference to FIGS. 21A and 21B.

Next, the calculation unit 2100 obtains an absolute difference value between the target data of the target data storage unit 2200 and the reference data of the reference data storage unit 2300 (step S310), and stores the obtained absolute difference value into the calculation result data 2410 of the correlation storage unit 2400 (step S320). After this, the PE adds the calculation result data to the received data 2420, and transmits the addition result data to the PE in the next line. Upon receiving the addition result data, the PE in the next line stores the received data into the received data 2420 of the PE itself.

On the other hand, if an instruction received from an instruction generating unit (3100 or the like) is an instruction to cancel (CANCEL in step S300), the PE ends the process without any operation.

Next, the process of the control information generating unit 3000 and the process of the instruction generating units (3100 and the like) will be described with reference to FIGS. 21A and 21B.

First, the process of the control information generating unit 3000 will be described with reference to FIG. 21A. FIG. 21A is a flowchart showing the process of the control information generating unit 3000 in Embodiment 3.

In the present embodiment, as described above, three types of instructions are generated by three types of control information. The control information generating unit 3000 generates tokens being the control information, using two counters.

Here will be described how tokens are generated by the control information generating unit 3000.

The control information generating unit 3000 generates a token using two counters: "Counter0" and "Counter1" (step S510)

The control information generating unit 3000 generates control information indicating an execution of a calculation, during a period in which "Counter0">0, or during a period in which "Counter1">0. It is presumed here that either one of the two counters is active. As the method of determining which of the two counters should be active, one method is to determine the active counter based on a signal from the instruction issuing unit 1003. In another method, when one of the counters completes counting, the counter itself becomes not-active and the other counter becomes active. In the present example, the latter method is adopted.

If both "Counter0" and "Counter1" are "0", the control information generating unit 3000 generates an "Invalid" token (step S511).

If "Counter0" is "≠0", the control information generating unit 3000 generates a "Valid,sel0" token (step S512), and if "Counter1" is "≠0", the control information generating unit 3000 generates a "Valid, sel1" token (step S513). Note that if both "Counter0" and "Counter1" are "≠0", it is regarded as an error.

Here, "sel0" represents an instruction to use the data stored in an area indicated by the register 0; and "sel1" represents an instruction to use the data stored in an area indicated by the register 1. Based on the instruction, the PE determines which of the memory cache 0 and the memory cache 1 to read data from.

After the control information generating unit 3000 generates a token, the control information generating unit 3000 decrements the counter that is "≠0", namely the active counter, by 1 (step S520).

Next, the process of the instruction generating units (3100 and the like) will be described with reference to FIG. 21B. FIG. 21B is a flowchart showing the process of an instruction generating unit (3100 or the like).

The plurality of instruction generating units (3100 and the like) each perform the same process as in Embodiment 1.

First, the instruction generating unit transmits the token stored in the control information storage unit 3110 to the next instruction generating unit (step S550), and receives a token from the preceding instruction generating unit or control information generating unit (step S560).

The instruction generating unit generates an instruction that is to be executed by a PE, based on the received token (step S570).

If the received token is "Invalid", the instruction generating unit generates an instruction that instructs to cancel the "exec_array" instruction (step S571); if the received token is "Valid,sel0", the instruction generating unit generates an instruction that instructs to execute the "exec_array" instruction using "data_sel0" (step S572); and if the received token is "Valid, sel1", the instruction generating unit generates an instruction that instructs to execute the "exec_array" instruction using "data_sel1" (step S573).

The generated calculation instruction is transmitted to each PE (step S575), and the token is stored in the control information storage unit 3110 (step S580).

The following will describe the relationship between the token generated by the control information generating unit 3000 and the execution by PEs.

FIG. 22 shows tokens and operations of PEs on a time axis.

It is presumed here that a token issued during a period in which "Counter0">0 is "Valid,sel0", and that a token issued during a period in which "Counter1">0 is "Valid,sel1".

Accordingly, for example, in cycle "Cyc 10", the PEs in the first and second lines of the PE array execute instructions that were generated by the "Valid,sel1" token, and the PEs in the fourth and fifth lines of the PE array execute instructions that were generated by the "Valid,sel0" token. Note that the PE in the third line of the PE array does not execute, and that the correlation storage unit 2400 of each PE is cleared. In this way, PEs are cancelled in sequence (7100), and this forms a separator between columns of the reference image.

Next, FIG. 23 shows an example of a program.

A program instruction list 7300 shows an operation 7302 for each program instruction 7301. It also shows an operation performed depending on the value of the control information (token).

For example, for token "Invalid" 7303, "exec_array" is "nop", namely, it is not executed. Also, for "Valid,sel0" 7304, "exec_array" indicates "execute using data_sel0", and for "Valid,sel1" 7305, "exec_array" indicates "execute using data_sel1".

A "ldp[addr],r0,r1" 7400 is an instruction to load the address of a line of the reference image into register 0 and register 1.

More specifically, an address indicated by [addr] is loaded into the register 0, and at the same time, an address indicated by [addr]+offset is loaded into the register 1. The "offset" is a difference value from an address of a data line. The offset may be given in advance, or may be generated as necessary. In one example of the case where the offset is given in advance, the offset is a difference between addresses of the last line data of a column and the first line data of the next column.

Also, an "exec_array r0 r1" is an instruction to perform a calculation using two lines of the reference image stored in areas indicated by register 0 and register 1.

Embodiment 4

<Outline>

In the present embodiment, the correlation with the reference image is obtained not using all the pixels of the target image 200, but using reduced number of pixels of the target image 200.

This method is effective in reducing the amount of calculation. Especially, the method is effective in a mobile device or the like that is driven by a battery, namely with a limited amount of power.

In a known method of reducing the pixels in number, pixels forming a grid pattern are removed.

In the present embodiment, pixels forming a grid pattern are removed from the target image. More specifically, the correlation is obtained by using pixels that form a grid pattern and are arranged alternately with the pixels that remain in the target image.

FIG. 24 shows an example of the target image and the reference image supplied to the PE array in Embodiment 4.

In the present embodiment, a target image 8200 and a target image 8210 are arrange on a PE array 1100, namely, stored in the target data storage unit 2200 of the PE. The target image 8200 and the target image 8210 are the same.

Target images (8201, 8011) are generated by arranging, on the PE array 1100, only data of calculation target pixels among the pixels constituting the two target images (8200, 8210). By reducing pixels forming a grid pattern, it is possible to map simultaneously two sets of horizontally arranged six pixels and vertically arranged five pixels.

On the other hand, from the reference image 100, two reference images (8011, 8021) are generated by picking up pieces of reference data at odd number positions and even number positions in two lines (8010, 8020), respectively.

That is to say, when the reference image is supplied, one line composed of seven pixels is divided into a line 8010 composed of six pixels and a line 8020 composed of six pixels that are shifted from the pixels of the line 8010 by one pixel, and the lines 8010 and 8020 are supplied. This enables to search two positions in the horizontal direction at the same time.

The reference data 8011 composed of two rows is generated from the reference data 8010, and the reference data 8021 composed of two rows is generated from the reference data 8020. The reference data 8010 and 8020 are combined to generate odd number reference data 8100 and even number reference data 8101.

Calculations are performed on the target images (8201, 8011) and the reference data (8011, 8021) on the PE array 1100 that are generated as described above.

With the above-described construction, it is possible to perform calculations on two blocks of reference data at the same time. This makes it possible to provide a simple control circuit, resulting in reduction of a great amount of processing time and power consumption.

It should be noted here that the array calculation device 1000 in the present embodiment has the same construction as the array calculation device 1000 in Embodiment 1 (see FIG. 17).

<Operation>

Next, the process of the array calculation device 1000 in the present embodiment will be described with reference to FIGS. 25-28. The basic process flow is the same as Embodiment 1 (FIGS. 9-12), and the following description will center on the differences.

Figure 25:
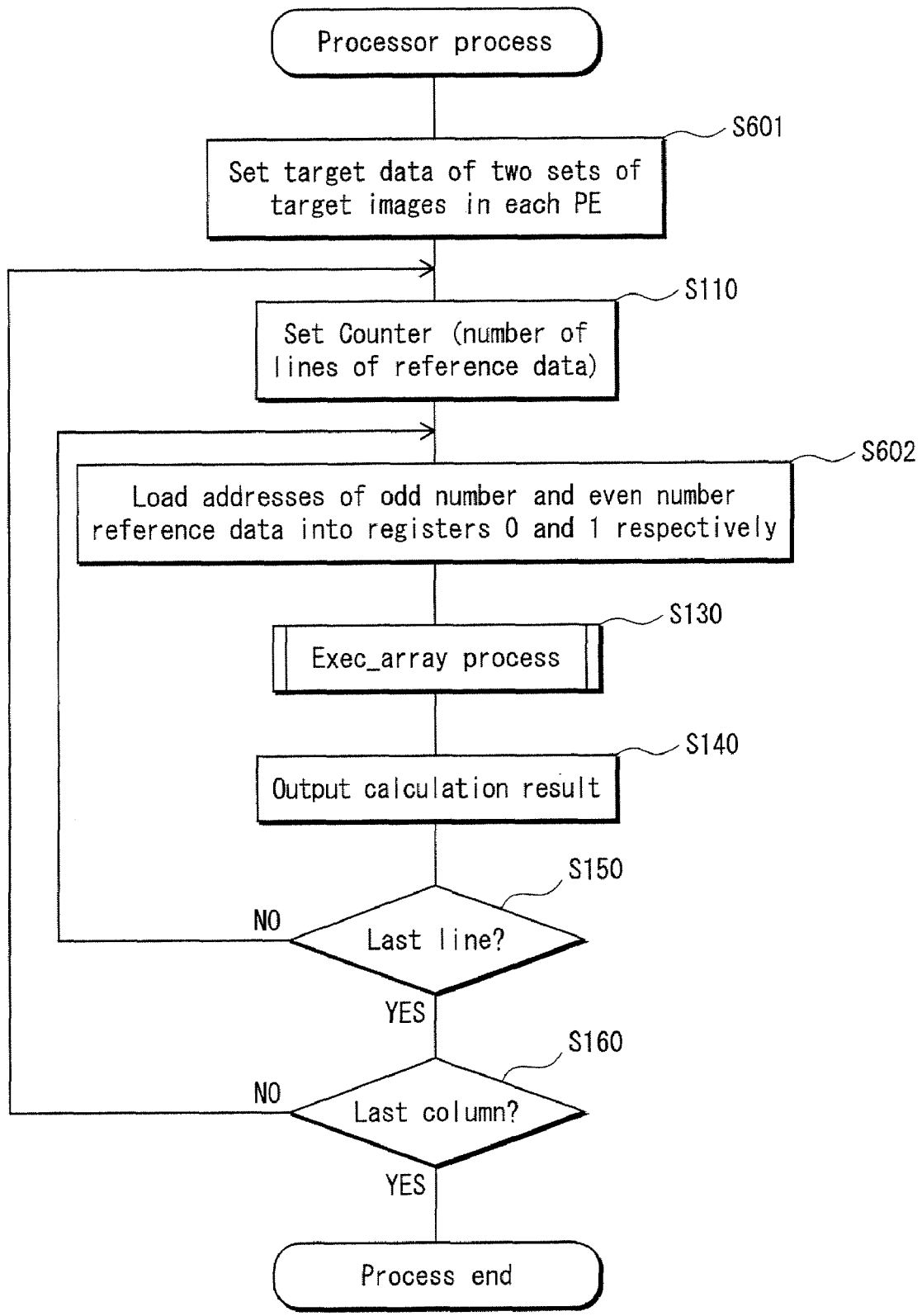
FIG. 25 is a flowchart showing the procedures of obtaining a correlation between the target image 200 and the reference image 100, in the array calculation device 1000 of Embodiment 4.

FIG. 25 is a flowchart showing the procedures in the array calculation device 1000 of obtaining a correlation between the target image 200 and the reference image 100. The process in the present embodiment differs from the process in Embodiment 1 (see FIG. 9) in that a reduced number of pieces of target data are set in PEs, and that two lines of reference data are divided into odd number reference data and even number reference data, and the odd number reference data and the even number reference data are set in the memory cache 0 and the memory cache 1, respectively.

In both Embodiments 3 and 4, two lines of reference data are used. However, they differ from each other in the following point. In Embodiment 3, there are periods during which two lines of reference data are used simultaneously. As a result, in the middle of a use of the first line, the second line is set in another memory cache. In contrast, in Embodiment 4, the data stored in the two memory caches are used during the same period. As a result, two pieces of data are set in the two memory caches simultaneously. Also, in Embodiment 4, the two pieces of data set in the two memory caches are used alternately.

First, target data is read from the target image 200 into the target data storage unit 2200 of each PE (step S601).

For example, the target images (8201, 8011) shown in FIG. 24, which are a result of removing pixels forming a grid pattern from the target image 200, are set.

A value is set in the counter storage unit 3010 of the control information generating unit 3000 (step S110) For example, "8" is set in "Counter".

Next, addresses of two lines of the reference image 100 to be supplied to the array calculation device 1000 are respectively loaded into register 0 and register 1 (step S602).

For example, the address of reference data 8100 shown in FIG. 24 is loaded into register 0, and the address of reference data 8101 is loaded into register 1.

After this, the "exec_array" process is performed (step S130), the calculation result is output (step S140). The calculation process is repeated until the last line of the reference image 100 (steps S120 to S150).

When the calculation has reached the last column of the reference image 100 (step S160), the process ends.

Figure 26:
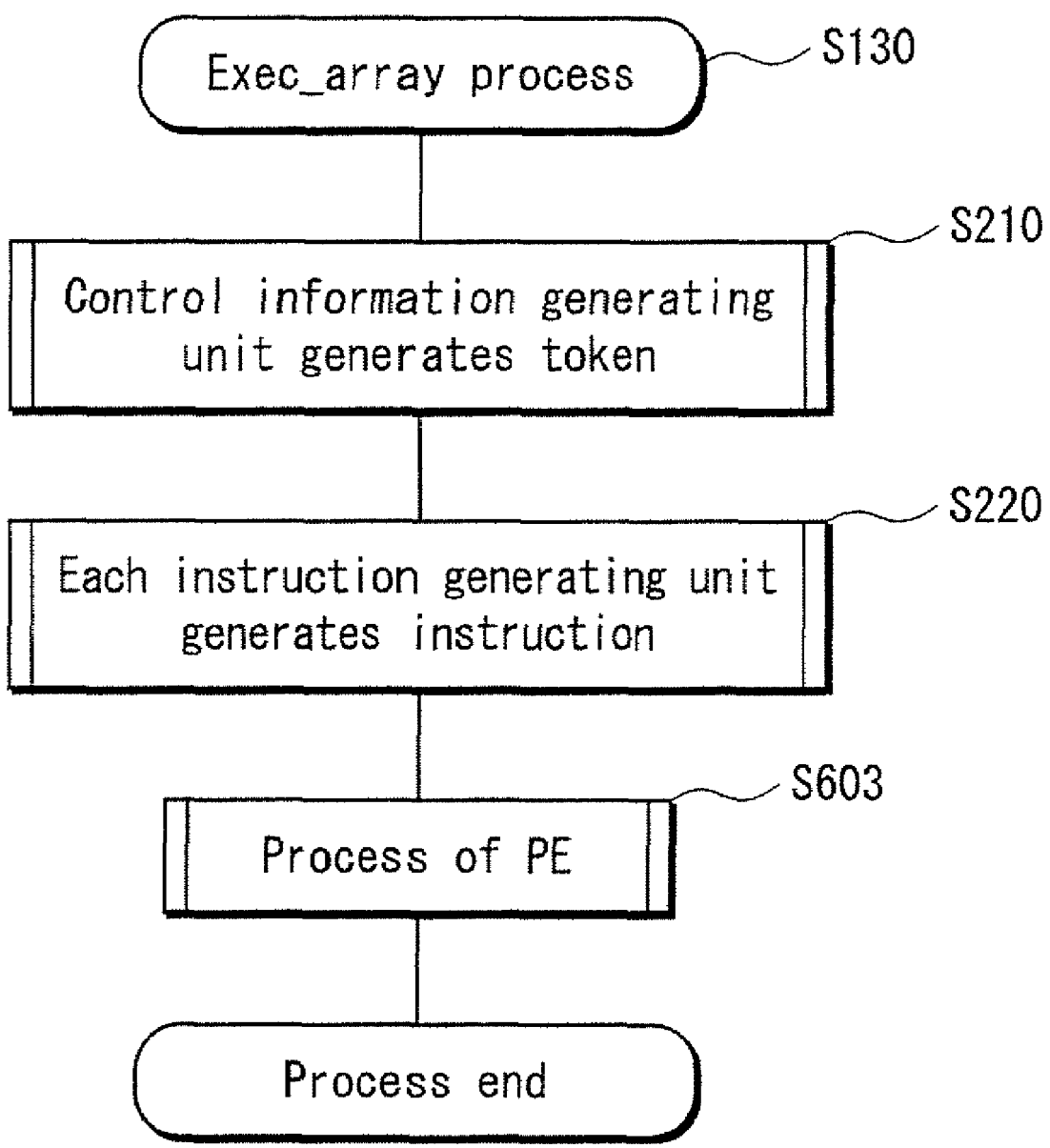
FIG. 26 is a flowchart showing the "exec_array" process in Embodiment 4.

FIG. 26 is a flowchart showing the "exec_array" process. The "exec_array" process in the present embodiment is almost the same as that in Embodiment 1 (see FIG. 10), except for the process performed by each PE (step S603).

Figure 27:
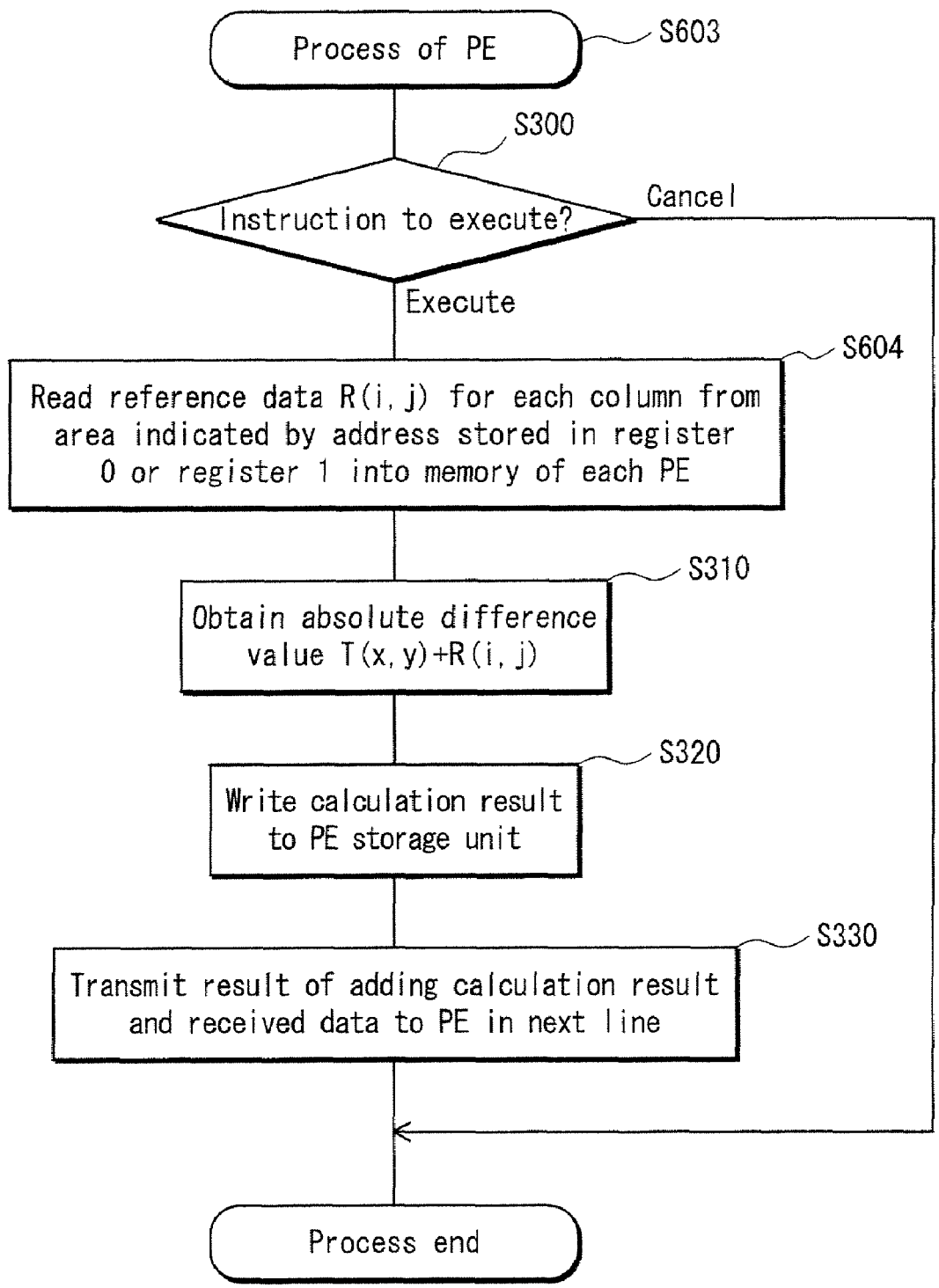
FIG. 27 is a flowchart showing the process performed by each PE in Embodiment 4.

Here will be described the process performed by each PE with reference to FIG. 27. FIG. 27 is a flowchart showing the process performed by each PE.

The process in the present embodiment differs from the process in Embodiment 1 (see FIG. 11) in that the reference data to be read into the reference data storage unit 2300 is read alternately from the memory cache 0 and the memory cache 1.

The reason for this is as follows. For example, in FIG. 29, target data "T01", "T20", "T40", . . . are set in the PEs in the first line of the PE array 1100, and calculations need to be performed on these data and reference data "R0y", "R2y", "R4y", . . . . Also, target data "T11", "T31", "T51", . . . are set in the PEs in the second line of the PE array 1100, and calculations need to be performed on these data and reference data "R1y", "R3y", "R5y", . . . .

If an instruction received from an instruction generating unit (3100 or the like) is an instruction to execute (EXECUTE in step S300), the PE reads the reference data from the reference data storage unit 2300 of the PE itself, from the memory cache 0 (1006) indicated by the register 0 or the memory cache 1 (1007) indicated by the register 1 (step S604).

Which memory cache to read data from is indicated by the instruction received from the instruction generating unit. The instruction will be described later with reference to FIGS. 28A and 28B.

Next, the calculation unit 2100 obtains an absolute difference value between the target data of the target data storage unit 2200 and the reference data of the reference data storage unit 2300 (step S310), and stores the obtained absolute difference value into the calculation result data 2410 of the correlation storage unit 2400 (step S320). After this, the PE adds the calculation result data to the received data 2420, and transmits the addition result data to the PE in the next line. Upon receiving the addition result data, the PE in the next line stores the received data into the received data 2420 of the PE itself.

On the other hand, if an instruction received from an instruction generating unit (3100 or the like) is an instruction to cancel (CANCEL in step S300), the PE ends the process without any operation.

Figure 28A:
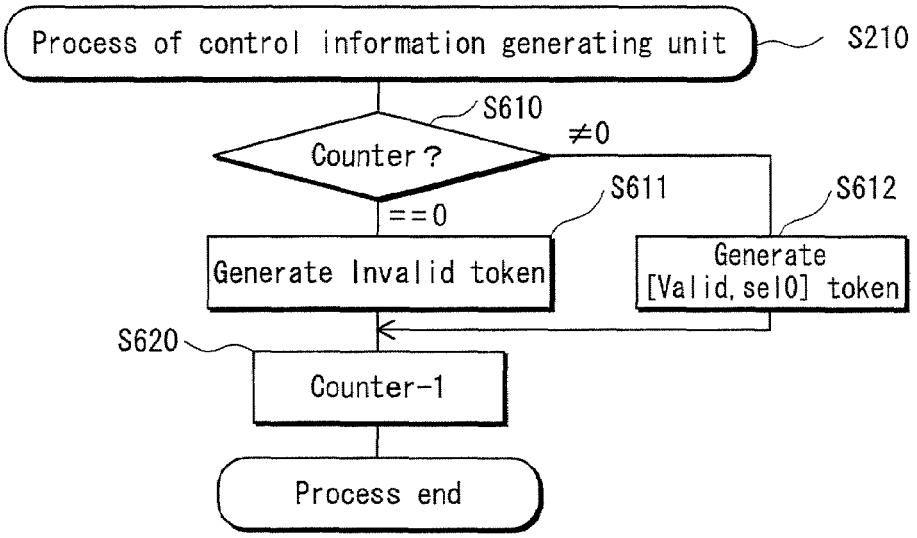
FIG. 28A is a flowchart showing the process of the control information generating unit 3000 in Embodiment 4.
Figure 28B:
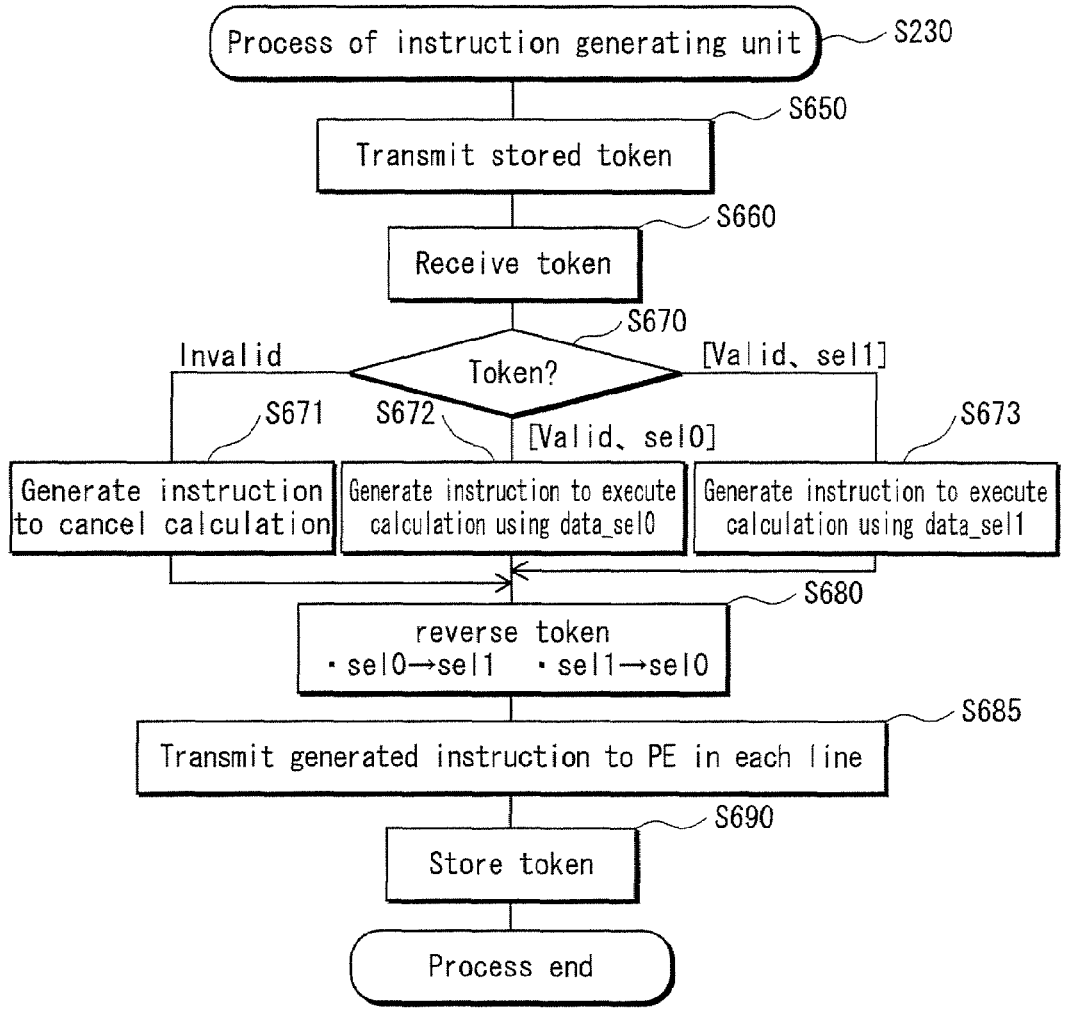
FIG. 28B is a flowchart showing the process of the instruction generating units (3100 and the like) in Embodiment 4.

Next, the process of the control information generating unit 3000 and the process of the instruction generating units (3100 and the like) will be described with reference to FIGS. 28A and 28B.

First, the process of the control information generating unit 3000 will be described with reference to FIG. 28A. FIG. 28A is a flowchart showing the process of the control information generating unit 3000 in Embodiment 4.

Here will be described how tokens are generated by the control information generating unit 3000.

The control information generating unit 3000 generates a token using counter "Counter" (step S610).

If "Counter" is "==0", the control information generating unit 3000 generates an "Invalid" token (step S611); and if "Counter" is "≠0", the control information generating unit 3000 generates a "Valid,sel0" token (step S612).

Here, "sel0" represents an instruction to use the data stored in an area indicated by the register 0.

After the control information generating unit 3000 generates a token, the control information generating unit 3000 decrements "Counter" by 1 (step S620).

Next, the process of the instruction generating units (3100 and the like) will be described with reference to FIG. 28B. FIG. 28B is a flowchart showing the process of an instruction generating unit (3100 or the like).

The plurality of instruction generating units (3100 and the like) each perform the same process as in Embodiment 1.

First, the instruction generating unit transmits the token stored in the control information storage unit 3110 to the next instruction generating unit (step S650), and receives a token from the preceding instruction generating unit or control information generating unit (step S660).

The instruction generating unit generates an instruction that is to be executed by a PE, based on the received token.

If the received token is "Invalid", the instruction generating unit generates an instruction that instructs to cancel the "exec_array" instruction (step S671); if the received token is "Valid,sel0", the instruction generating unit generates an instruction that instructs to execute the "exec_array" instruction using "data_sel0" (step S672); and if the received token is "Valid, sel1", the instruction generating unit generates an instruction that instructs to execute the "exec_array" instruction using "data_sel1" (step S673).

After this, the token is changed from "sel0" to "sel1", or from "sel1" to "sel0" (step S680). This is done so that the PEs in the next line can read data from a different memory cache.

The generated calculation instruction is transmitted to each PE (step S685), and the token is stored in the control information storage unit 3110 (step S690.

The following will describe the relationship between the token generated by the control information generating unit 3000 and the execution by PEs.

Figure 29:
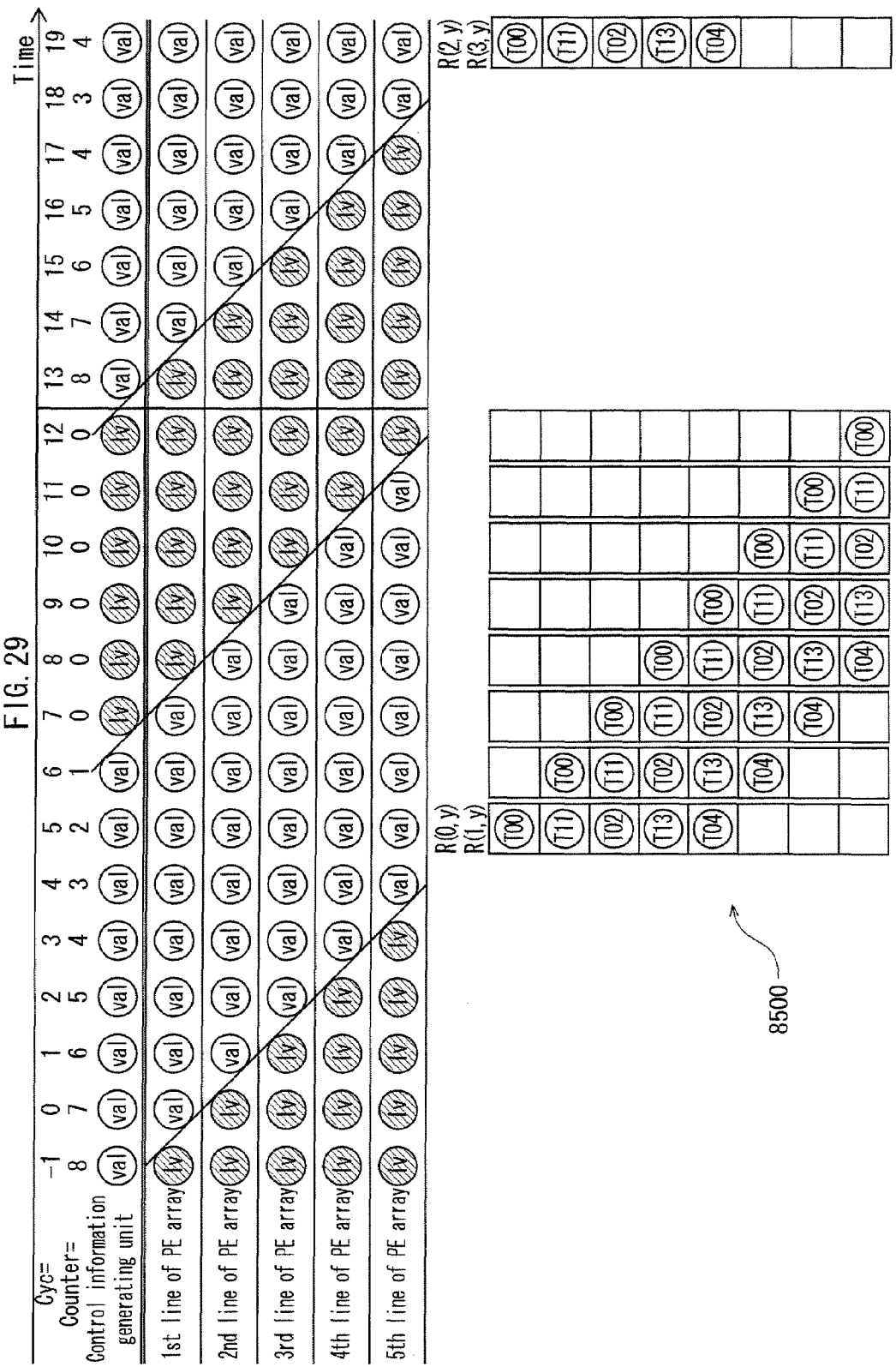
FIG. 29 shows tokens and operations of PEs on a time axis in Embodiment 4.

FIG. 29 shows tokens and operations of PEs on a time axis.

The Valid token issued by the control information generating unit 3000 is "Valid,sel0". However, the PE in each line of the PE array receives an instruction that is generated based on either "Valid,sel0" or "Valid,sel1".

Accordingly, for example, in cycle "Cyc 0", the token for the first line of the PE array is "Valid,sel0", and the token for the second line of the PE array is "Valid,sel1", reversed from the token for the first line.

That is to say, instructions generated by the "Valid, sel0" token are executed on the PEs in the first, third, and fifth lines, and instructions generated by the "Valid, sel1" token are executed on the PEs in the second and fourth lines.

Next, FIG. 30 shows an example of a program.

A program instruction list 8600 shows an operation 8602 for each program instruction 8601. It also shows an operation performed depending on the value of the control information (token).

For example, for token "Invalid" 8603, "exec_array" is "nop", namely, it is not executed. Also, for "Valid,sel0" 8604, "exec_array" indicates "execute using data_sel0", and for "Valid,sel1" 8605, "exec_array" indicates "execute using data_sel1".

A "ld[addr],r0,r1" 8700 is an instruction to load the addresses of the following reference images into register 0 and register 1. More specifically, an address indicated by [addr] is loaded into the register 0, and at the same time, an address indicated by [addr]+offset is loaded into the register 1. For example, when the reference data 8100 and the reference data 8101 shown in FIG. 24 are successively stored in the memory, [addr] represents the address of the reference data 8100, and "offset" represents the length of the reference data 8100, Also, an "exec_array r0 r1" 8701 is an instruction to perform a calculation using the reference data stored in an area indicated by register 0 or register 1.

It should be noted here that the "exec_array r0 r1" 8701 and the "exec_array r0 r1" 8702 are the same instructions, but which register is used depends on the token.

<Supplementary Notes>

Up to now, the array calculation device of the present invention has been described through several embodiments. However, the present invention is not limited to these embodiments, but may be modified as follows, for example.

(1) In the above-described embodiments, PEs in the PE array are connected in the line direction, and are operated in units of lines, with an instruction generating unit provided in each line. However, PEs in the PE array may be connected to each other in the column direction and slant direction, as well as in the line direction, with an instruction generating unit provided.

With this construction, an instruction generated based on the token can be transferred to a given PE in the PE array. In this case, more flexible executions can be provided by setting a register or generating a token such that the input destination of data used by each PE can be changed dynamically, or by determining a PE that executes an instruction, namely, by determining a range in which the instruction is applied.

(2) In the above-described embodiments, the PE array is achieved by hardware. However, the PE array may be achieved by such hardware that can be reconfigured dynamically. Here, the hardware that can be reconfigured dynamically is hardware that can change dynamically the logical construction of the hardware by sending construction information to a programmable wiring that connects each logic of the hardware.

(3) In Embodiment 4, the reference data is changed by reversing the token. However, the conversion circuit may fixedly hold information that indicates even number positions and odd number positions. That is to say, a register, from which data is read, may be fixed to each line of the PE array.

INDUSTRIAL APPLICABILITY

The array calculation device of the present invention can achieve a flexible and high-performance process with a simple device construction, and therefore is especially useful as a calculator for use in image processing LSI.

The invention claimed is:

1. An array calculation device comprising:
a processor array composed of a plurality of processor elements having been assigned with orders;
an instruction acquiring unit operable to acquire an instruction in each cycle;
a first unit operable to generate, in each cycle, operation control information for controlling an operation of a processor element of a first order, and then generate an instruction to the processor element of the first order in accordance with the operation control information and the instruction acquired by the instruction acquiring unit; and
a second unit operable to generate, in each cycle, operation control information for controlling an operation of each processor element of a next order and onwards, in accordance with operation control information generated for controlling an operation of a processor element of an immediately preceding order, and then generate an instruction to each processor element of the next order and onwards, in accordance with the operation control information generated by the second unit in each cycle and the instruction acquired by the instruction acquiring unit.

2. The array calculation device of claim 1, wherein
the plurality of processor elements constituting the processor array are connected to each other by signal lines, and
with respect to each of the plurality of processor elements, a calculation result of a processor element is transferred to a processor element of a next order, in each cycle via a signal line.

3. The array calculation device of claim 1 further comprising
a basic control information generating unit operable to generate basic control information in each cycle, wherein
the operation control information for controlling the operation of the processor element of the first order is generated in accordance with the basic control information generated by the basic control information generating unit.

4. The array calculation device of claim 1, wherein
each processor element includes a data acquiring unit operable to acquire a plurality of types of data,
the operation control information includes specification information that specifies a type of data to be used when each processor element executes an instruction, and each processor element acquires and uses data of the type specified by the specification information when executing an instruction.

5. The array calculation device of claim 1, wherein the operation control information is information that specifies whether or not to execute the instruction acquired by the instruction acquiring unit, and if the operation control information specifies to execute the instruction, the processor element executes the instruction, and if the operation control information specifies not to execute the instruction, a power supply to the processor element is inhibited.

6. An array calculation device comprising:

a processor array of a two dimensional array structure in which processor elements are arranged in M lines by N columns, wherein N pieces of processor elements in each line are connected by signal lines, and the processor elements are connected so that a calculation result of each processor element is transferred to a processor element of a next line;

a basic control information generating unit operable to generate basic control information in each cycle;

an instruction acquiring unit operable to acquire an instruction in each cycle;

a first unit operable to generate, in each cycle, operation control information for controlling an operation of a processor element of a first line, in accordance with the basic control information generated by the basic control information generating unit, and then generate an instruction to the first line in accordance with the operation control information and the instruction acquired by the instruction acquiring unit; and a second unit operable to generate, in each cycle, operation control information for controlling an operation of each processor element of 2-M lines, in accordance with operation control information generated for controlling an operation of a processor element of an immediately preceding line, and then generate an instruction to each processor element of 2-M lines, in accordance with the operation control information generated by the second unit in each cycle and the instruction acquired by the instruction acquiring unit, wherein the N pieces of processor elements in each line of the processor array execute an instruction to the line.

* * * * *